(12) United States Patent
Vo et al.

(10) Patent No.: US 11,398,017 B2
(45) Date of Patent: Jul. 26, 2022

(54) HDR TONE MAPPING BASED ON CREATIVE INTENT METADATA AND AMBIENT LIGHT

(71) Applicant: Samsung Electronics Co., Ltd., Suwon-si (KR)

(72) Inventors: Dung Trung Vo, Costa Mesa, CA (US); Chenguang Liu, Tustin, CA (US); McClain C. Nelson, Anaheim, CA (US); William Mandel, Moorpark, CA (US); Soojung Hyun, Tustin, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/169,201

(22) Filed: Feb. 5, 2021

(65) Prior Publication Data

US 2022/0114707 A1    Apr. 14, 2022

Related U.S. Application Data

(60) Provisional application No. 63/090,139, filed on Oct. 9, 2020.

(51) Int. Cl.
*G06T 5/00* (2006.01)
*G06T 5/40* (2006.01)

(52) U.S. Cl.
CPC ............... *G06T 5/009* (2013.01); *G06T 5/40* (2013.01)

(58) Field of Classification Search
CPC .................................. G06T 5/009; G06T 5/40
See application file for complete search history.

(56) References Cited

U.S. PATENT DOCUMENTS

| 6,700,628 B1 * | 3/2004 | Kim ......................... G06T 5/40 |
| | | 348/687 |
| 9,076,218 B2 * | 7/2015 | Tsai ..................... H04N 19/117 |

(Continued)

FOREIGN PATENT DOCUMENTS

| EP | 1418543 B1 | 5/2008 |
| KR | 20160121782 A | 10/2016 |
| WO | 2020146655 A1 | 7/2020 |

OTHER PUBLICATIONS

Ikizyan, I., "HDR Dynamic Tone Mapping with Enhanced Rendering Control", SID Symposium Digest of Technical Papers, May 29, 2019, pp. 303-306, v. 50, issue 1, Wiley Online Library, United States.

(Continued)

*Primary Examiner* — David T Welch
(74) *Attorney, Agent, or Firm* — Sherman IP LLP; Kenneth L. Sherman; Hemavathy Perumal

(57) ABSTRACT

One embodiment provides a method comprising determining multi-dimensional metadata corresponding to an input image, and determining ambient light information indicative of a level of ambient light in an ambient environment of a display device. The multi-dimensional metadata comprises a cumulative distribution function (CDF) of pixels in the input image. The method further comprises determining, based on the multi-dimensional metadata and the ambient light information, one or more gains that adaptively compensate for the level of ambient light in the ambient environment. The method further comprises generating a tone mapping function based on the one or more gains, and applying the tone mapping function to the input image to generate a tone-mapped image that adaptively compensates for the level of ambient light in the ambient environment. The tone-mapped image is provided to the display device for presentation.

20 Claims, 16 Drawing Sheets
(3 of 16 Drawing Sheet(s) Filed in Color)

270

(56) References Cited

U.S. PATENT DOCUMENTS

| | | | |
|---|---|---|---|
| 9,165,210 B1* | 10/2015 | Srinivasan | G06K 9/4642 |
| 9,280,936 B2 | 3/2016 | Delfs et al. | |
| 9,478,157 B2 | 10/2016 | Wu et al. | |
| 2003/0031345 A1* | 2/2003 | Farmer | B60R 21/01538 |
| | | | 382/103 |
| 2008/0297816 A1 | 12/2008 | Nikkanen et al. | |
| 2011/0205227 A1* | 8/2011 | Fischer | G06T 5/50 |
| | | | 345/419 |
| 2011/0292246 A1 | 12/2011 | Brunner | |
| 2012/0141014 A1* | 6/2012 | Lepikhin | G06T 5/009 |
| | | | 382/154 |
| 2013/0222645 A1* | 8/2013 | Bilcu | H04N 19/162 |
| | | | 348/239 |
| 2016/0005349 A1 | 1/2016 | Atkins et al. | |
| 2016/0360171 A1 | 12/2016 | Tao et al. | |
| 2016/0381401 A1* | 12/2016 | Katsavounidis | H04N 21/81 |
| | | | 725/116 |
| 2017/0116963 A1 | 4/2017 | Wanat et al. | |
| 2017/0214917 A1 | 7/2017 | Jia et al. | |
| 2017/0256039 A1 | 9/2017 | Hsu et al. | |
| 2017/0272690 A1 | 9/2017 | Seifi et al. | |
| 2018/0097992 A1* | 4/2018 | Douady-Pleven | G06T 5/50 |
| 2019/0188857 A1* | 6/2019 | Rivard | G06T 5/008 |
| 2019/0304379 A1 | 10/2019 | Pytlarz et al. | |
| 2020/0014897 A1 | 1/2020 | Kim et al. | |
| 2021/0250564 A1 | 8/2021 | Pieri et al. | |
| 2022/0108429 A1 | 4/2022 | Li et al. | |

OTHER PUBLICATIONS

International Telecommunication Union (ITU-R), "Reference electro-optical transfer function for flat panel displays used in HDTV studio production", Rec. ITU-R BT.1886, Mar. 2011, 7 pages, downloaded on Jan. 29, 2021 at https://www.itu.int/dms_pubrec/itu-r/rec/bt/R-REC-BT.1886-0-201103-I!!PDF-E.pdf.

International Telecommunication Union (ITU-R), "High dynamic range television for production and international programme exchange," Rep. ITU-R BT.2390.7, Jul. 2019, 59 pages, downloaded on Jan. 29, 2021 at https://www.itu.int/dms_pub/itu-r/opb/rep/R-REP-BT.2390-7-2019-PDF-E.pdf.

U.S. Non-Final Office Action for U.S. Appl. No. 17/169,207 dated Mar. 14, 2022.

International Search Report & Written Opinion dated Jan. 19, 2022 for International Application PCT/KR2021/013882 from Korean Intellectual Property Office, pp. 1-9, Republic of Korea.

International Search Report & Written Opinion dated Mar. 8, 2022 for International Application PCT/KR2021/013882 from Korean Intellectual Property Office, pp. 1-9, Republic of Korea.

U.S. Final Office Action for U.S. Appl. No. 17/169,207 dated May 3, 2022.

* cited by examiner

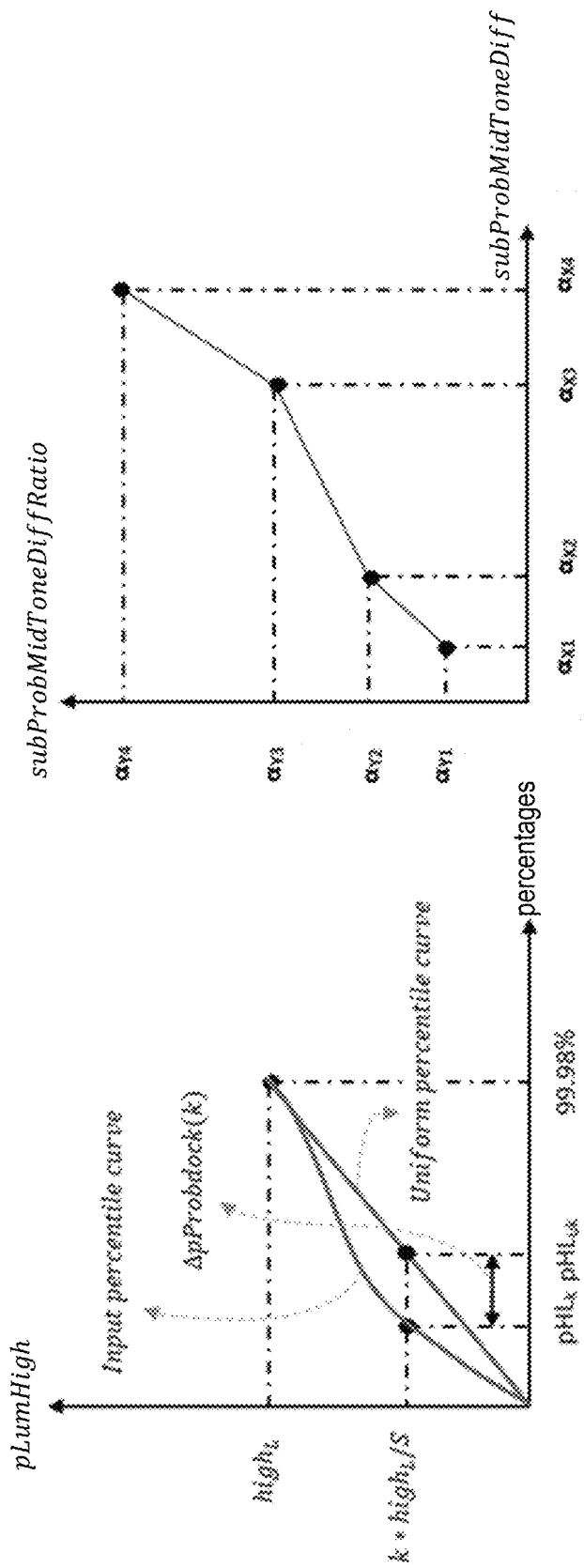

HDR TONE MAPPING BASED ON CREATIVE INTENT METADATA AND AMBIENT LIGHT

CROSS-REFERENCE TO RELATED APPLICATIONS

The present application claims priority to U.S. Provisional Patent Application No. 63/090,139, filed on Oct. 9, 2020, incorporated by reference in its entirety.

TECHNICAL FIELD

One or more embodiments generally relate to device settings for consumer electronics, in particular, a method and system for high-dynamic range (HDR) tone mapping based on creative intent metadata and ambient light.

BACKGROUND

Consumer electronic devices (e.g., smart television, smartphone, etc.) are now equipped with state-of-the-art display screens (e.g., QLED, OLED) that provide ultra-high picture quality.

SUMMARY

One embodiment provides a method comprising determining multi-dimensional metadata corresponding to an input image, and determining ambient light information indicative of a level of ambient light in an ambient environment of a display device. The multi-dimensional metadata comprises a cumulative distribution function (CDF) of pixels in the input image. The method further comprises determining, based on the multi-dimensional metadata and the ambient light information, one or more gains that adaptively compensate for the level of ambient light in the ambient environment. The method further comprises generating a tone mapping function based on the one or more gains, and applying the tone mapping function to the input image to generate a tone-mapped image that adaptively compensates for the level of ambient light in the ambient environment. The tone-mapped image is provided to the display device for presentation.

Another embodiment provides a system comprising at least one processor and a non-transitory processor-readable memory device storing instructions that when executed by the at least one processor causes the at least one processor to perform operations. The operations include determining multi-dimensional metadata corresponding to an input image, and determining ambient light information indicative of a level of ambient light in an ambient environment of a display device. The multi-dimensional metadata comprises a CDF of pixels in the input image. The operations further include determining, based on the multi-dimensional metadata and the ambient light information, one or more gains that adaptively compensate for the level of ambient light in the ambient environment. The operations further include generating a tone mapping function based on the one or more gains, and applying the tone mapping function to the input image to generate a tone-mapped image that adaptively compensates for the level of ambient light in the ambient environment. The tone-mapped image is provided to the display device for presentation.

Another embodiment provides a non-transitory processor-readable medium that includes a program that when executed by a processor performs a method comprising determining multi-dimensional metadata corresponding to an input image, and determining ambient light information indicative of a level of ambient light in an ambient environment of a display device. The multi-dimensional metadata comprises a CDF of pixels in the input image. The method further comprises determining, based on the multi-dimensional metadata and the ambient light information, one or more gains that adaptively compensate for the level of ambient light in the ambient environment. The method further comprises generating a tone mapping function based on the one or more gains, and applying the tone mapping function to the input image to generate a tone-mapped image that adaptively compensates for the level of ambient light in the ambient environment. The tone-mapped image is provided to the display device for presentation.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 5 is a graph illustrating differences in percentages between an input percentile curve and a uniform percentile curve, in one or more embodiments;

FIG. 6 is a graph illustrating a ramp function for sub-ProbMidToneDiffRatio, in one or more embodiments;

DETAILED DESCRIPTION

Figure 1:
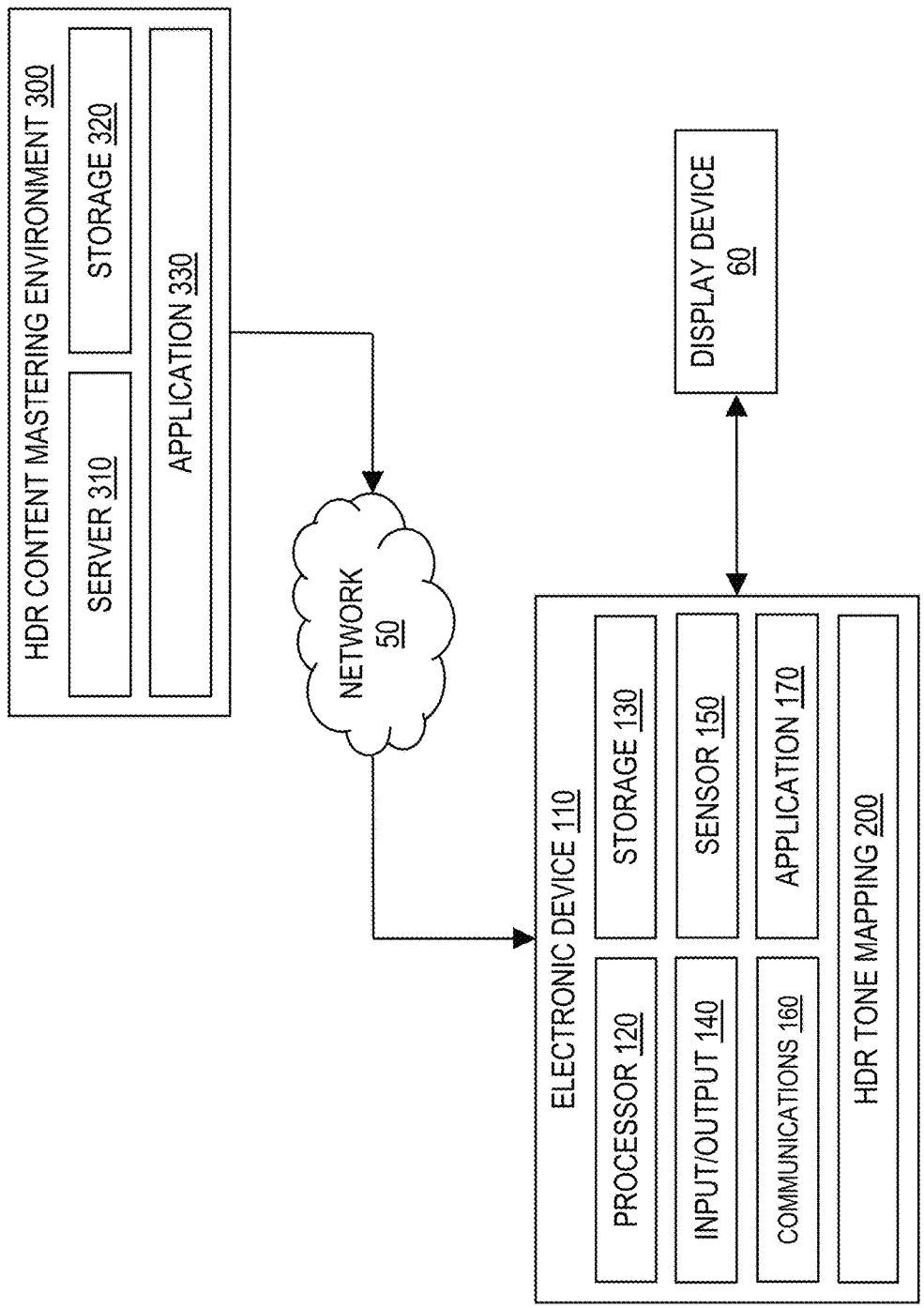
FIG. 1 illustrates an example computing architecture for implementing high-dynamic range (HDR) tone mapping of HDR content for presentation on a display device, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to device settings for consumer electronics, in particular, a method and system for high-dynamic range (HDR) tone mapping based on creative intent metadata and ambient light. One embodiment provides a method comprising determining multi-dimensional metadata corresponding to an input image, and determining ambient light information indicative of a level of ambient light in an ambient environment of a display device. The multi-dimensional metadata comprises a cumulative distribution function (CDF) of pixels in the input image. The method further comprises determining, based on the multi-dimensional metadata and the ambient light information, one or more gains that adaptively compensate for the level of ambient light in the ambient environment. The method further comprises generating a tone mapping function based on the one or more gains, and applying the tone mapping function to the input image to generate a tone-mapped image that adaptively compensates for the level of ambient light in the ambient environment. The tone-mapped image is provided to the display device for presentation.

Another embodiment provides a system comprising at least one processor and a non-transitory processor-readable memory device storing instructions that when executed by the at least one processor causes the at least one processor to perform operations. The operations include determining multi-dimensional metadata corresponding to an input image, and determining ambient light information indicative of a level of ambient light in an ambient environment of a display device. The multi-dimensional metadata comprises a CDF of pixels in the input image. The operations further include determining, based on the multi-dimensional metadata and the ambient light information, one or more gains that adaptively compensate for the level of ambient light in the ambient environment. The operations further include generating a tone mapping function based on the one or more gains, and applying the tone mapping function to the input image to generate a tone-mapped image that adaptively compensates for the level of ambient light in the ambient environment. The tone-mapped image is provided to the display device for presentation.

Another embodiment provides a non-transitory processor-readable medium that includes a program that when executed by a processor performs a method comprising determining multi-dimensional metadata corresponding to an input image, and determining ambient light information indicative of a level of ambient light in an ambient environment of a display device. The multi-dimensional metadata comprises a CDF of pixels in the input image. The method further comprises determining, based on the multi-dimensional metadata and the ambient light information, one or more gains that adaptively compensate for the level of ambient light in the ambient environment. The method further comprises generating a tone mapping function based on the one or more gains, and applying the tone mapping function to the input image to generate a tone-mapped image that adaptively compensates for the level of ambient light in the ambient environment. The tone-mapped image is provided to the display device for presentation.

For expository purposes, the terms "tone mapping curve" and "tone mapping function" are used interchangeably in this specification. For expository purposes, the term "ambient light compensation curve" as used herein generally represents a tone mapping curve with ambient light compensation.

Studios typically provide content tone mastered for presentation on a display device in a very dark environment. For example, an environment in which a colorist at a studio color grades content is very dark. People, however, seldom watch TV or any other display device in complete darkness. During presentation of content on a display device, if the level of ambient lighting in an environment surrounding the display device increases, the perceived on-screen picture quality of the display device progressively degrades.

Let the term "creative intent" generally denote a particular visualization of an image that a content provider or content creator (e.g., a colorist at a studio) intended for an audience to see.

One or more embodiments provide HDR tone mapping with ambient light compensation that is based creative intent metadata to preserve creative intent in different levels of ambient light. In one embodiment, the HDR tone mapping includes dynamically correcting picture quality based on the creative intent metadata.

One or more embodiments provide a method and system for HDR video tone mapping. In one embodiment, the HDR video tone mapping includes: (1) receiving an input video for presentation on a display device, (2) receiving metadata that is at least partially representative of frame or scene statistics information for the video, (3) determining an adaptive/customized tone mapping function with ambient light compensation based at least on the metadata, a level of ambient light in an environment of the display device, and a characteristic of the display device, and (4) applying the tone mapping function to the input video to generate a tone-mapped video with ambient light compensation, wherein the tone-mapped video is provided to the display device for presentation on the display device.

One or more embodiments provide ambient light compensation with an adaptive, explicit Bezier curve with multiple sections, wherein the multiple sections have multiple adjustment points along the Bezier curve for improved control of tone mapping.

FIG. 1 illustrates an example computing architecture 100 for implementing HDR tone mapping of HDR content for presentation on a display device 60, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a HDR tone mapping system 200 configured to implement HDR tone mapping of HDR content for presentation on a display device 60 integrated in or coupled to the electronic device 110. In one embodiment, the HDR tone mapping system 200 is configured to provide ambient light compensation based on creative intent metadata and ambient light. As described in detail later herein, the HDR tone mapping system 200 is configured to: (1) receive an input video (e.g., a HDR video) for presentation on the display device 60, (2) receive multi-dimensional creative intent metadata corresponding to the input video, wherein the creative intent metadata is indicative of an intent of a content creator/content provider of the input video, and (3) improve picture quality during presentation of the input video on the display device 60 based on the creative intent metadata and ambient light, thereby reducing or minimizing imagery degradation caused by the ambient light. In one embodiment, the picture quality is improved by providing ambient light compensation based on the creative intent metadata, modifying a tone mapping curve based on the ambient light compensation, and/or providing color hue preservation.

In one embodiment, creative intent metadata corresponding to an input content comprises contains per frame or scene statistics information for the entire input video (e.g., the entire HDR video). For example, in one embodiment, the creative intent metadata comprises, for each image (e.g., HDR image) of the input video, luminance percentile information corresponding to the image. Luminance percentile information corresponding to an image represents a distribution (i.e., number) of pixels in the image. For example, in one embodiment, luminance percentile information corresponding to an image comprises one or more percentiles of a CDF of pixels in the image. In one embodiment, the CDF is indicative of one or more of the following: whether the image is dark or bright, which dynamic range of the CDF has dark details and degree/level of darkness of the dark details, or which dynamic range of the CDF has bright details and degree/level of brightness of the bright details. For example, if the CDF includes a particular range that is steeper than at least one other range of the CDF, there are more details (i.e., more pixels) in this particular range compared to the at least one other range. As another example, if the CDF includes a particular range that is flatter than at least one other range of the CDF, there are fewer details (i.e., less pixels) in this particular range compared to the at least one other range.

In one embodiment, for each image (e.g., HDR image) of the input content, the HDR tone mapping system 200 is configured to generate, based on a CDF of pixels in the image, a tone mapping curve corresponding to the image. The tone mapping curve comprises multiple sections that preserve contrast. For example, if the CDF includes a particular range that is steeper than at least one other range of the CDF, the tone mapping curve includes a section corresponding to the steeper range, wherein the corresponding section is steeper than at least one other section of the tone mapping curve as there are more details to preserve. As another example, if the CDF includes a particular range that is flatter than at least one other range of the CDF, the tone mapping curve includes a section corresponding to the flatter range, wherein the corresponding section is flatter than at least one other section of the tone mapping curve as there are fewer details to preserve. Based on CDFs of pixels in images of the input video, the HDR tone mapping system 200 is able to differentiate the images and apply different ambient light compensation curves based on the CDFs (i.e., ambient light compensation is adaptive to creative intent metadata). For example, dark details in brighter images are lifted more to prevent the dark details from becoming crushed.

In one embodiment, luminance percentile information is represented as two-dimensional (2D) data. For example, in one embodiment, each percentile of a CDF curve included in luminance percentile information is represented as a pair {x, y} of values, wherein x denotes a percentile luminance value, and y denotes a pixel percentage value (e.g., {x=100, y=25%} represents that 25% of pixels are below 100 nits, i.e., $25^{th}$ percentile is 100 nits). Utilizing a tone mapping curve based on CDF enables noise removal (i.e., noisy pixels are removed).

Let h(i) generally denote a histogram, wherein i is the $i^{th}$ bin of the histogram. Let cdf(i) generally denote a CDF. In one embodiment, the HDR tone mapping system 200 is configured to: (1) receive, as input, a RGB image (e.g., an image from the input video), (2) determine a maxRGB image based on the RGB image, (3) determine a histogram h(i) corresponding to the maxRGB image, and (4) determine a CDF cdf(i) of pixels in the RGB image based on the histogram h(i). In one embodiment, the histogram h(i) has 1024 bins and 10 bits of input. In one embodiment, the CDF cdf(i) is computed in accordance with equation (1) provided below:

$$cdf(i) = \sum_{k=0}^{i} h(i). \tag{1}$$

Examples of an electronic device 110 include, but are not limited to, a television (e.g., a smart television), a mobile electronic device (e.g., a tablet, a smart phone, a laptop, etc.), a wearable device (e.g., a smart watch, a smart band, a head-mounted display, smart glasses, etc.), a set-top box, an Internet of things (IoT) device, etc.

In one embodiment, the electronic device 110 comprises one or more sensor units 150 integrated in or coupled to the electronic device 110, such as a camera, a microphone, a GPS, a motion sensor, etc. In one embodiment, the HDR tone mapping system 200 utilizes at least one of the one or more sensor units 150 to capture sensor data comprising one or more readings/measurements relating to an ambient environment of the display device 60 (e.g., a HDR display), such as a degree/level of ambient light in the ambient environment.

In one embodiment, the electronic device 110 comprises one or more I/O units 140 integrated in or coupled to the electronic device 110. In one embodiment, the one or more I/O units 140 include, but are not limited to, a physical user interface (PUI) and/or a GUI, such as a keyboard, a keypad, a touch interface, a touch screen, a knob, a button, a display screen, etc. In one embodiment, a user can utilize at least one I/O unit 140 to configure one or more user preferences, configure one or more parameters, provide input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the display device 60 (e.g., receiving display characteristics of the display device 60 including the peak luminance level $D_{nit}$). The communications unit 160 is further configured to exchange data with a remote computing environment, such as a HDR content mastering environment 300 (e.g., receiving a video stream from the HDR content mastering environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the HDR content mastering environment 300 includes resources, such as one or more servers 310 and one or more storage units 320. One or more applications 330 that provide higher-level services may execute/operate on the HDR content mastering environment 300 utilizing the resources of the HDR content mastering environment 300. For example, in one embodiment, the HDR content mastering environment 300 provides an online platform for hosting one or more online services (e.g., a video streaming service, etc.) and/or distributing one or more software mobile applications 170. As another example, the system 200 may be loaded onto or downloaded to the electronic device 110 from a HDR content mastering environment 300 that maintains and distributes updates for the system 200. As yet another example, a HDR content mastering environment 300 may comprise a cloud computing environment providing shared pools of configurable computing system resources and higher-level services.

Figure 2:
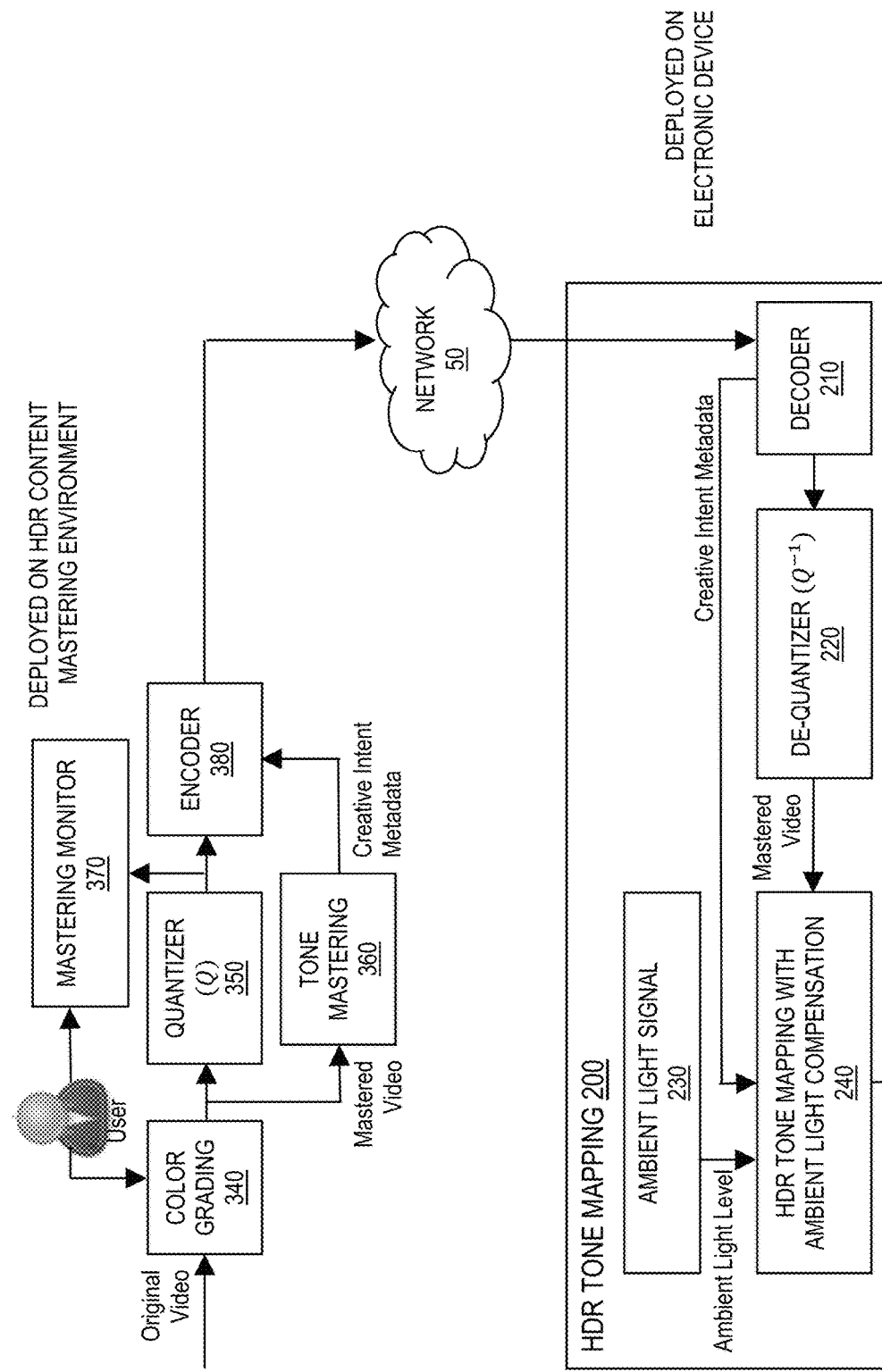
FIG. 2 illustrates an example workflow for implementing HDR tone mapping of HDR content for presentation on a display device, in one or more embodiments.

FIG. 2 illustrates an example workflow for implementing HDR tone mapping of HDR content for presentation on a display device 60, in one or more embodiments. In one embodiment, the HDR content mastering environment 300 represents a computing environment utilized for color grading at a studio. For example, in one embodiment, the one or more applications 330 deployed on the HDR content mastering environment 300 comprise a color grading unit 340 configured to: (1) receive an original video, and (2) perform color grading on the original video based on input from a user (e.g., a colorist at the studio), resulting in a mastered video.

Let Q generally denote a number of quantization bits. In one embodiment, the one or more applications 330 deployed on the HDR content mastering environment 300 comprise a quantizer unit 350 configured to: (1) receive a mastered video (e.g., from the color grading unit 340), and (2) perform quantization on the mastered video, resulting in a quantized signal of the mastered video.

In one embodiment, the HDR content mastering environment 300 comprises a mastering monitor 370 configured to: (1) receive a quantized signal (e.g., from the quantizer unit 350) of a mastered video, and (2) provide a user (e.g., the colorist at the studio) with visual feedback of one or more color graded adjustments (i.e., adjustments to an original video resulting from color grading) by displaying the mastered video based on the quantized signal.

In one embodiment, the one or more applications 330 deployed on the HDR content mastering environment 300 comprise a tone mastering unit 360 configured to: (1) receive a mastered video (e.g., from the color grading unit 340), and (2) generate creative intent metadata corresponding to the mastered video. In one embodiment, the tone mastering unit 360 automatically generates the creative intent metadata. In another embodiment, the tone mastering unit 360 generates the creative intent metadata based on input from a user (e.g., a content creator at the studio).

In one embodiment, the one or more applications 330 deployed on the HDR content mastering environment 300 comprise an encoder unit 380 configured to: (1) receive a quantized signal (e.g., from the quantizer unit 350) of a mastered video, (2) receive creative intent metadata corresponding to the mastered video (e.g., from the tone mastering unit 360), (3) perform encoding on the quantized signal, resulting in an encoded video that is combined with the creative intent metadata, and (4) provide the encoded video for transmission via the communications network 50.

In one embodiment, the HDR tone mapping system 200 comprises a decoder unit 210 deployed on the electronic device 110. In one embodiment, the decoder unit 210 is configured to: (1) receive an encoded video (e.g., from the HDR content mastering environment 300) transmitted via the communications network 50, (2) perform decoding on the encoded video, resulting in a quantized signal of a mastered video, and (3) extract, from the encoded video, creative intent metadata corresponding to the mastered video.

In one embodiment, the HDR tone mapping system 200 comprises a de-quantizer unit 220 deployed on the electronic device 110. In one embodiment, the de-quantizer unit 220 is configured to: (1) receive a quantized signal of a mastered video (e.g., from the decoder unit 210), and (2) perform de-quantization on the quantized signal video, resulting in the mastered video.

In one embodiment, the HDR tone mapping system 200 comprises an ambient light signal unit 230 deployed on the electronic device 110. In one embodiment, the ambient light signal unit 230 is configured to: (1) receive sensor data captured by at least one sensor unit 150 of the electronic device 110, and (2) determine ambient light information indicative of a degree/level of ambient light in an ambient environment of the display device 60 based on the sensor data.

In one embodiment, the HDR tone mapping system 200 comprises a HDR tone mapping with ambient light compensation system 240 deployed on the electronic device 110. In one embodiment, the HDR tone mapping with ambient light compensation system 240 is configured to: (1) receive a mastered video (e.g., from the de-quantizer unit 220), (2) receive creative intent metadata corresponding to the mastered video (e.g., from the decoder unit 210), (3) receive ambient light information (e.g., from the ambient light signal unit 230) indicative of a degree/level of ambient light in an ambient environment of the display device 60, (4) determine an adaptive/customized tone mapping function (i.e., tone mapping curve) with ambient light compensation based at least on the creative intent metadata and the ambient light information, (5) apply the tone mapping function to the mastered video, resulting in a tone-mapped video with ambient light compensation, and (6) provide the tone-mapped video to the display device 60 for presentation on the display device 60.

Figure 3:
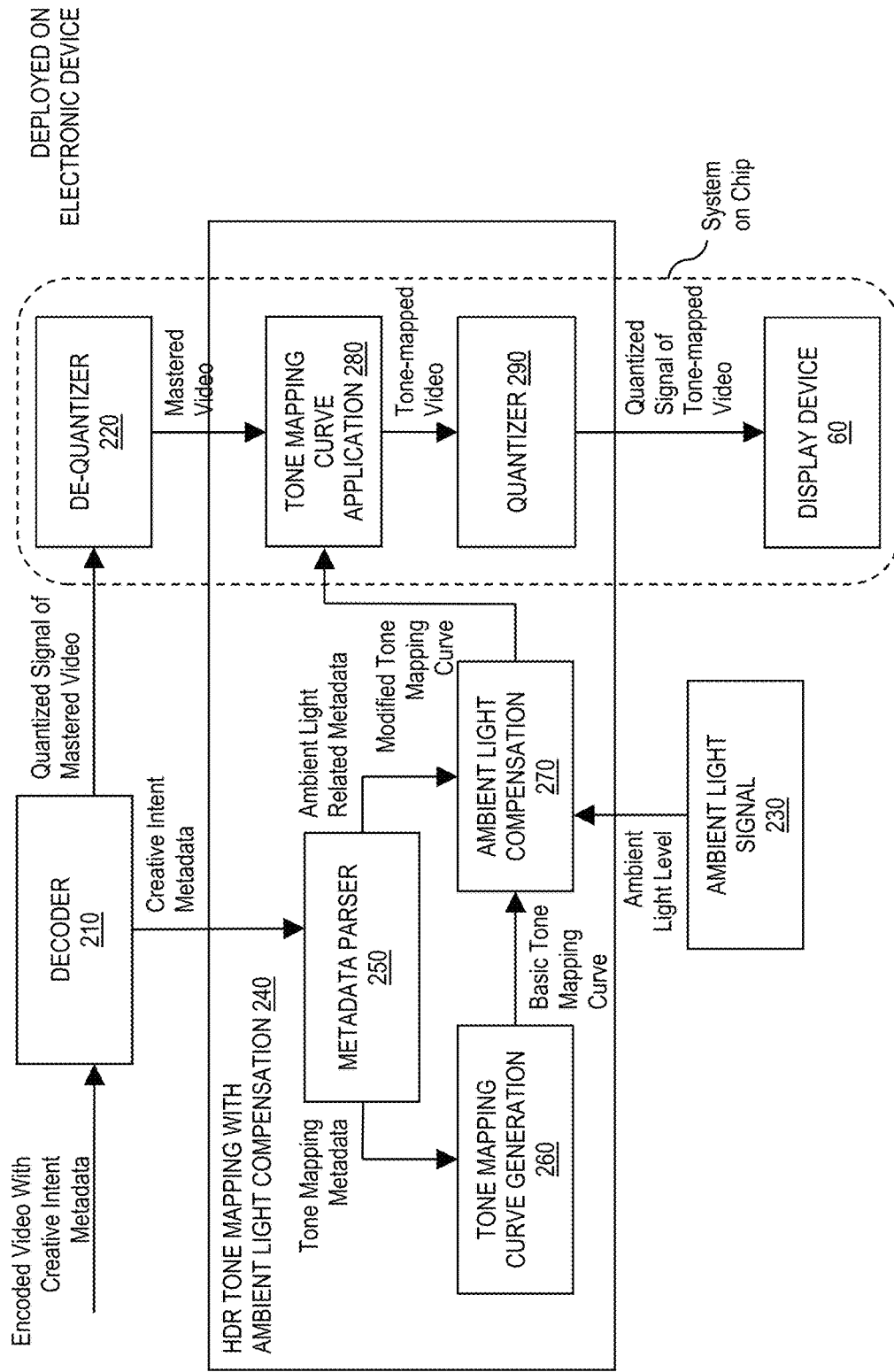
FIG. 3 illustrates an example HDR tone mapping with ambient light compensation system, in one or more embodiments.

FIG. 3 illustrates an example HDR tone mapping with ambient light compensation system 240, in one or more embodiments. In one embodiment, the HDR tone mapping with ambient light compensation system 240 comprises a metadata parser unit 250 deployed on the electronic device 110. In one embodiment, the metadata parser unit 250 is configured to: (1) receive creative intent metadata (e.g., from the decoder unit 210) corresponding to a mastered video, and (2) parse the creative intent metadata into two sets of metadata, specifically tone mapping metadata corresponding to the mastered video and ambient light related metadata corresponding to the mastered video.

In one embodiment, the HDR tone mapping with ambient light compensation system 240 comprises a tone mapping curve generation unit 260 deployed on the electronic device 110. In one embodiment, the tone mapping curve generation unit 260 is configured to: (1) receive tone mapping metadata corresponding to a mastered video, and (2) generate a dynamic basic tone mapping function (i.e., basic tone mapping curve) and corresponding parameters based on the tone mapping metadata.

In one embodiment, the HDR tone mapping with ambient light compensation system 240 comprises an ambient light compensation system 270 deployed on the electronic device 110. In one embodiment, the ambient light compensation system 270 is configured to: (1) receive ambient light related metadata corresponding to a mastered video, (2) receive ambient light information (e.g., from the ambient light signal unit 230) indicative of a degree/level of ambient light in an ambient environment of the display device 60, (3) receive a basic tone mapping function (i.e., basic tone mapping curve) and corresponding parameters (e.g., from the tone mapping curve generation unit 260), (4) based on the ambient light related metadata and the ambient light information, modify the basic tone mapping function to account for the degree/level of ambient light in the ambient environment, resulting in a modified tone mapping function (i.e., modified tone mapping curve) and corresponding parameters. The modified tone mapping function adaptively compensates for the degree/level of ambient light in the ambient environment. The modified tone mapping function preserves a content creator's intent as it factors into account the ambient light related metadata.

In one embodiment, the HDR tone mapping with ambient light compensation system 240 comprises a tone mapping curve application system 280 deployed on the electronic device 110. In one embodiment, the tone mapping curve application system 280 is configured to: (1) receive a mastered video (e.g., from the de-quantizer unit 220), (2) receive a modified tone mapping function (i.e., tone mapping curve) and corresponding parameters (e.g., from the ambient light compensation system 270), and (3) apply the modified tone mapping function to the mastered video, resulting in a tone-mapped video with ambient light compensation (i.e., the tone-mapped video adaptively compensates for a degree/level of ambient light in an ambient environment of the display device 60).

In one embodiment, the HDR tone mapping with ambient light compensation system 240 comprises a quantizer unit 290 deployed on the electronic device 110. In one embodiment, the quantizer unit 290 is configured to: (1) receive a tone-mapped video with ambient light compensation (e.g., from the tone mapping curve application system 280), (2) perform quantization on the tone-mapped video, resulting in a quantized signal of the tone-mapped video, and (3) provide the quantized signal to the display device 60 for presentation of the tone-mapped video on the display device 60.

In one embodiment, the de-quantizer unit 220, the tone mapping curve application system 280, the quantizer unit 290, and the display device 60 are implemented utilizing one or more HDR10+ standard processing pipelines available on a SoC (system on chip) (i.e., additional hardware is not required), such that there is no additional hardware cost to the SoC.

Figure 4:
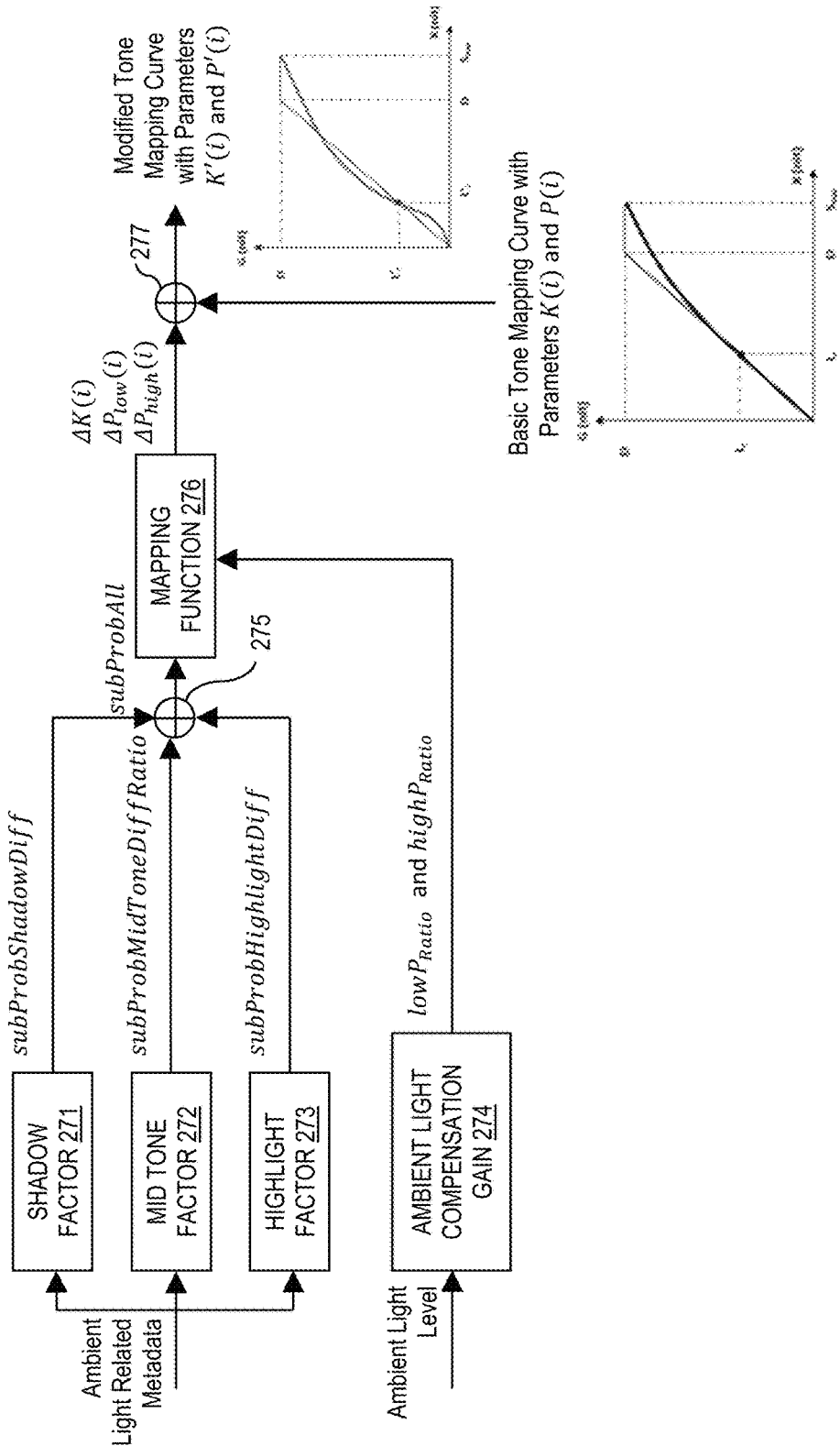
FIG. 4 illustrates an example ambient light compensation system, in one or more embodiments.

FIG. 4 illustrates an example ambient light compensation system 270, in one or more embodiments. In one embodiment, the ambient light compensation system 270 is configured to determine, based on ambient light related metadata corresponding to a mastered video, three different factors corresponding to shadow pixels of the mastered video, mid tone pixels of the mastered video, and high light pixels of the mastered video.

Let [0, $high_L$] generally denote a range of luminance levels, wherein $high_L$ is a highest luminance level of the range. In one embodiment, the range [0, $high_L$] is divided into S levels.

In one embodiment, the ambient light compensation system 270 comprises a mid tone factor unit 272 deployed on the electronic device 110. In one embodiment, the mid tone factor unit 272 is configured to: (1) receive ambient light related metadata (e.g., from the metadata parser 250) corresponding to a mastered video, and (2) determine, based on the ambient light related metadata, a factor subProbMidToneDiff corresponding to mid tone pixels of the mastered video. In one embodiment, the factor subProbMidToneDiff is based on differences in percentages between an input percentile curve and a uniform percentile curve at the S levels (i.e., difference in low range luminance between interpolated percentiles and uniform histogram percentiles). For example, in one embodiment, the factor subProbMidToneDiff is determined in accordance with equation (2) provided below:

$$subProbMidToneDiff = \sum_{k=1}^{S} \Delta pProbdock(k). \quad (2)$$

In one embodiment, the mid tone factor unit 272 is configured to determine a factor subProbMidToneDiffRatio utilizing a ramp function controlled based on subProbMidToneDiff.

In one embodiment, the ambient light compensation system 270 comprises a shadow factor unit 271 deployed on the electronic device 110. In one embodiment, the shadow factor unit 271 is configured to: (1) receive ambient light related metadata (e.g., from the metadata parser 250) corresponding to a mastered video, and (2) determine, based on the ambient light related metadata, a factor subProbShadowDiff corresponding to shadow pixels of the mastered video. In one embodiment, the factor subProbShadowDiff is based on differences in percentages between an input percentile curve and a uniform percentile curve at the S levels (i.e., difference in low range luminance between interpolated percentiles and uniform histogram percentiles).

In one embodiment, the ambient light compensation system 270 comprises a highlight factor unit 273 deployed on the electronic device 110. In one embodiment, the highlight factor unit 273 is configured to: (1) receive ambient light related metadata (e.g., from the metadata parser 250) corresponding to a mastered video, and (2) determine, based on the ambient light related metadata, a factor subProbHighlightDiff corresponding to high light pixels of the mastered video. In one embodiment, the factor subProbHighlightDiff is based on an average pLumHighAvg of the three highest percentiles of pLumHigh. For example, in one embodiment, pLumHighAvg is determined in accordance with equation (3) provided below:

$$pLumHighAvg = \frac{pLumHigh(L-2) + pLumHigh(L-1) + pLumHigh(L)}{3}, \quad (3)$$

wherein L is a number of percentiles in the ambient light related metadata. In one embodiment, the factor subProbHighlightDiff is determined utilizing a ramp function controlled based on pLumHighAvg.

In one embodiment, the ambient light compensation system 270 comprises an ambient light compensation gain unit 274 deployed on the electronic device 110. In one embodiment, the ambient light compensation gain unit 274 is configured to: (1) receive ambient light information (e.g., from the ambient light signal unit 230) indicative of a degree/level of ambient light in an ambient environment of the display device 60, and (2) determine, based on the ambient light information, one or more gains for adaptive ambient light compensation in the ambient environment. In one embodiment, the one or more gains include $lowP_{Ratio}$ and $highP_{Ratio}$ for determining a lower curve modifier and a higher curve modifier, respectively. In one embodiment, $lowP_{Ratio}$ and $highP_{Ratio}$ are determined utilizing ramp functions controlled based on the degree/level of ambient light in the ambient environment.

In one embodiment, the ambient light compensation system 270 comprises a combination unit 275 deployed on the electronic device 110. In one embodiment, the combination unit 275 is configured to: (1) receive a factor subProbShadowDiff (e.g., from the shadow factor unit 271) corresponding to shadow pixels of a mastered video, (2) receive a factor subProbMidToneDiff Ratio (e.g., from the mid tone factor unit 272) corresponding to mid tone pixels of the mastered video, (3) receive a factor subProbHighlightDiff (e.g., from the highlight factor unit 273) corresponding to highlight pixels of the mastered video, and (4) determine, based on each factor received, a combined factor subProbAll. In one embodiment, the combined factor subProbAll is determined in accordance with equation (4) provided below:

$$subProbAll = subProbShadowDiff + subProbMidToneDiffRatio + subProbHighlightDiff \quad (4).$$

In one embodiment, the ambient light compensation system 270 comprises a mapping function unit 276 deployed on the electronic device 110. In one embodiment, the mapping function unit 276 is configured to: (1) receive a combined factor subProbAll (e.g., from the combination unit 275), (2) receive gains $lowP_{Ratio}$ and $highP_{Ratio}$ (e.g., from the ambient light compensation gain unit 274) for ambient light compensation in an ambient environment of the display device 60, and (3) determine, based on the combined factor subProbAll and the gains $lowP_{Ratio}$ and $highP_{Ratio}$) one or more modifiers for modifying a basic tone mapping function (i.e., basic tone mapping curve). In one embodiment, the one or more modifiers determined by the mapping function unit 276 include a knee point modifier $\Delta K(i)$, a lower curve modifier $\Delta P_{low}(i)$ for modifying a lower section of the basic tone mapping function, and a higher curve modifier $\Delta P_{high}(i)$ for modifying a higher section of the basic tone mapping function, wherein $i \in (1, N)$. In one embodiment, the modifiers $\Delta K(i)$, $\Delta P_{low}(i)$, and $\Delta P_{high}(i)$ are determined utilizing ramp functions.

In one embodiment, the ambient light compensation system 270 comprises a combination unit 277 deployed on the electronic device 110. In one embodiment, the combination unit 277 is configured to: (1) receive a basic tone mapping function (i.e., basic tone mapping curve) with corresponding parameters $K(i)$ and $P(i)$, (2) receive modifiers $\Delta K(i)$, $\Delta P_{low}(i)$, and $\Delta P_{high}(i)$ (e.g., from the mapping function unit 276), and (3) modify the basic tone mapping function based on the modifiers $\Delta K(i)$, $\Delta P_{low}(i)$, and $\Delta P_{high}(i)$ resulting in a modified tone mapping function (i.e., modified tone mapping curve) with corresponding parameters $K'(i)$, $P'_{low}(i)$, and $P'_{high}(i)$.

In one embodiment, the modified tone mapping function is an explicit Bezier curve that adaptively compensates for ambient light. The modified tone mapping function has multiple sections, wherein the multiple sections have multiple adjustment points along the Bezier curve for improved control of tone mapping. For example, in one embodiment, the parameters $P'_{low}(i)$ and $P'_{high}(i)$ are adjustment points for lower and higher sections (i.e., curves) of the Bezier curve.

In one embodiment, the combination unit 277 is configured to optimize the lower curve modifier $\Delta P_{low}(i)$ to minimize a difference between the parameter $P'_{low}(i)$ and a manually tuned parameter $P_{tuned}(i)$. For example, in one embodiment, the mapping function unit 276 determines the parameter $P'_{low}(i)$ in accordance with equation (5) provided below:

$$P'_{low}(i) = P_{low}(i) + lowP_{ratio} * \Delta P_{low}(i) \quad (5),$$

wherein $P_{low}(i)$ is a parameter corresponding to the basic tone mapping function at zero degree/level of ambient light.

In one embodiment, the combination unit 277 is configured to optimize the higher curve modifier $\Delta P_{high}(i)$ to minimize a difference between the parameter $P'_{high}(i)$ and the manually tuned parameter $P_{tuned}(i)$. For example, in one embodiment, the mapping function unit 276 determines the parameter $P'_{high}(i)$ in accordance with equation (6) provided below:

$$P'_{high}(i) = P_{high}(i) + highP_{ratio} * \Delta P_{high}(i) \quad (6),$$

wherein $P_{high}(i)$ is a parameter corresponding to the basic tone mapping function at zero degree/level of ambient light.

In one embodiment, the combination unit 277 is configured to optimize the knee point modifier ΔK to minimize a difference between the parameter K'(i) and a manually tuned parameter $K_{tuned}(i)$. For example, in one embodiment, the mapping function unit 276 determines the parameter K'(i) in accordance with equation (7) provided below:

$$K'(i)=K(i)+highP_{ratio}*\Delta K \qquad (7),$$

wherein K(i) is a parameter corresponding to the basic tone mapping function at zero degree/level of ambient light.

FIG. 5 is a graph 400 illustrating differences in percentages between an input percentile curve and a uniform percentile curve, in one or more embodiments. A horizontal axis of the graph 400 represents percentages. A vertical axis of the graph 400 represents percentiles of pLumHigh. The graph 400 comprises the input percentile curve and the uniform percentile curve. As shown in FIG. 5, the range [0, $high_L$] is divided into S levels. The ambient light compensation system 270 is configured to determine, at each of the S levels, a corresponding difference ΔpProbdock(k) representing a difference in percentages between the input percentile curve and the uniform percentile curve. For example, as shown in FIG. 5, at the percentile $$k*\frac{high_L}{S},$$

a corresponding difference ΔpProbdock(k) represents a difference between a percentage $pHL_k$ of the input percentile curve and a percentage $pHL_{uk}$ of the uniform percentile curve.

FIG. 6 is a graph 450 illustrating a ramp function for subProbMidToneDiffRatio, in one or more embodiments. A horizontal axis of the graph 450 represents subProbMidToneDiff. A vertical axis of the graph 450 represents subProbMidToneDiffRatio. As shown in FIG. 6, subProbMidToneDiffRatio is determined utilizing a ramp function controlled based on subProbMidToneDiff.

Figure 7:
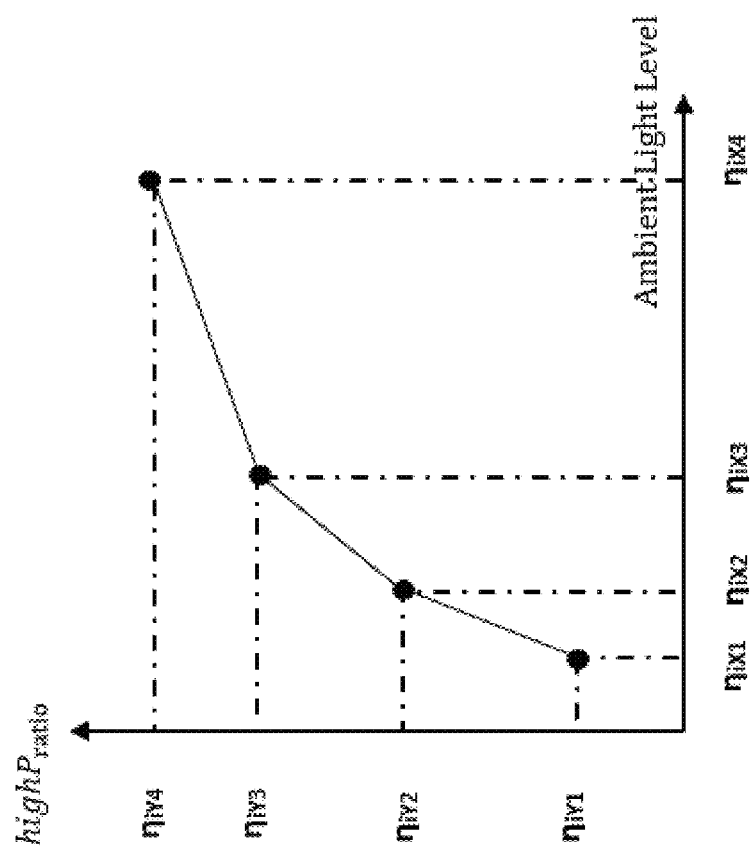
FIG. 7 is a graph illustrating a ramp function for gain highP$_{ratio}$, in one or more embodiments.

FIG. 7 is a graph 500 illustrating a ramp function for gain $highP_{ratio}$, in one or more embodiments. A horizontal axis of the graph 500 represents a degree/level of ambient light ("ambient light level") in an ambient environment. A vertical axis of the graph 500 represents $highP_{ratio}$. As shown in FIG. 7, $highP_{ratio}$ is determined utilizing a ramp function controlled based on the degree/level of ambient light in the ambient environment.

Figure 8:
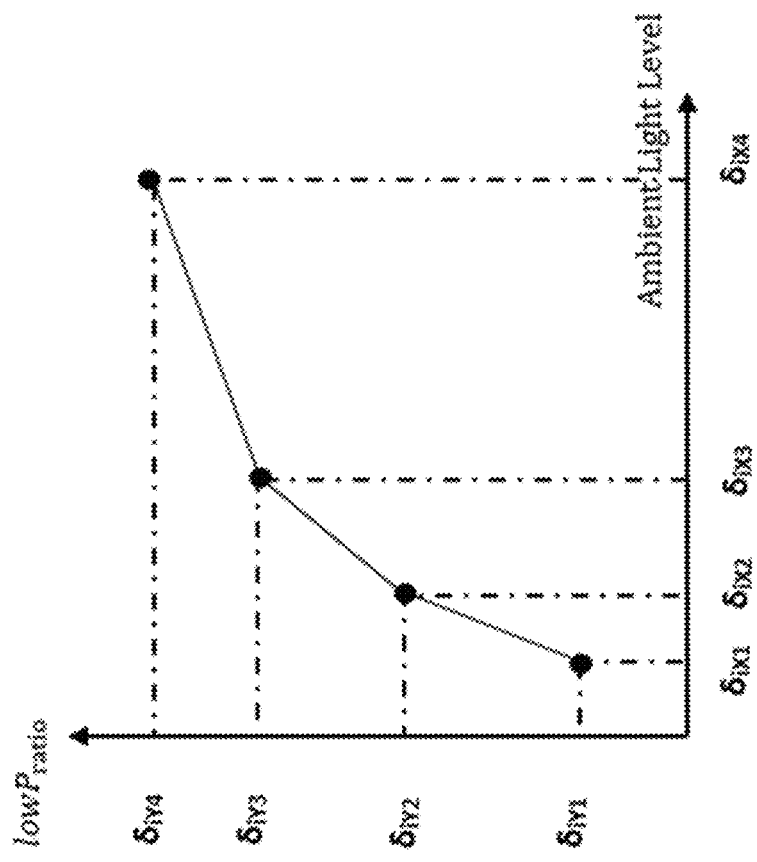
FIG. 8 is a graph illustrating a ramp function for gain lowP$_{ratio}$, in one or more embodiments.

FIG. 8 is a graph 550 illustrating a ramp function for gain $lowP_{ratio}$, in one or more embodiments. A horizontal axis of the graph 550 represents a degree/level of ambient light ("ambient light level") in an ambient environment. A vertical axis of the graph 550 represents $lowP_{ratio}$. As shown in FIG. 8, $lowP_{ratio}$ is determined utilizing a ramp function controlled based on the degree/level of ambient light in the ambient environment.

Figure 9:
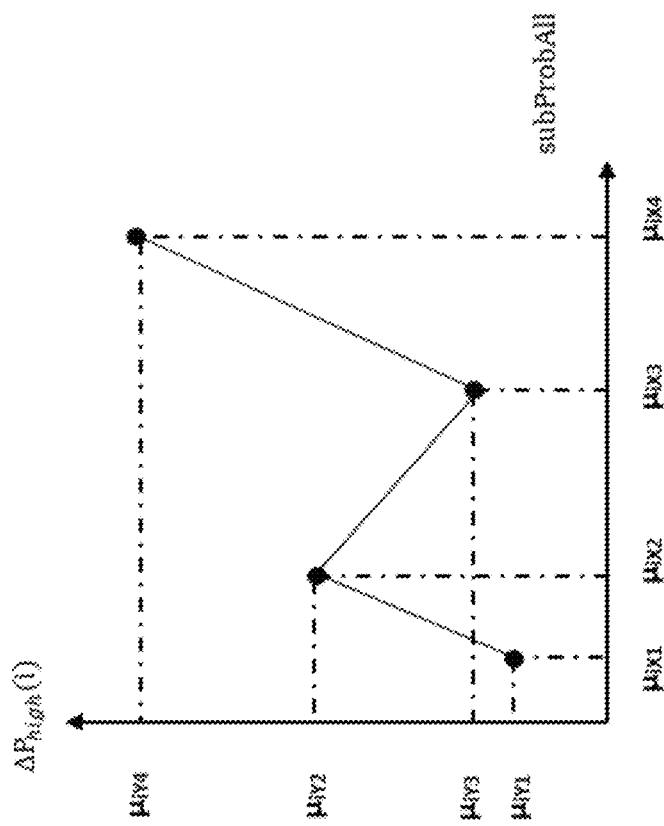
FIG. 9 is a graph illustrating a ramp function for $\Delta P_{high}(i)$, in one or more embodiments.

FIG. 9 is a graph 600 illustrating a ramp function for $\Delta P_{high}(i)$, in one or more embodiments. A horizontal axis of the graph 600 represents a combined factor subProbAll. A vertical axis of the graph 600 represents $\Delta P_{high}(i)$. As shown in FIG. 9, $\Delta P_{high}(i)$ is determined utilizing a ramp function controlled based on the combined factor subProbAll.

Figure 10:
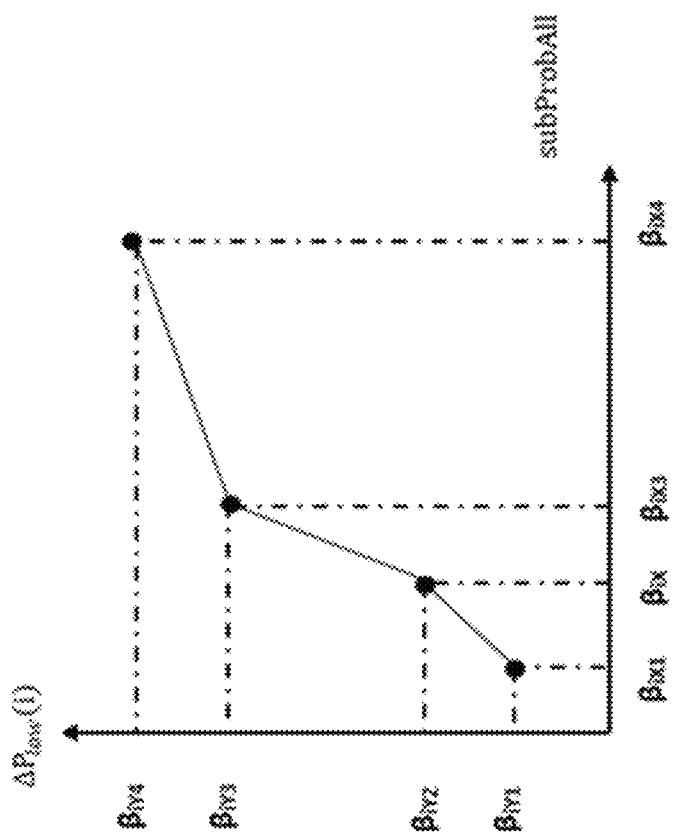
FIG. 10 is a graph illustrating a ramp function for lower curve modifier $\Delta P_{low}(i)$, in one or more embodiments.

FIG. 10 is a graph 650 illustrating a ramp function for lower curve modifier $\Delta P_{low}(i)$, in one or more embodiments. A horizontal axis of the graph 650 represents a combined factor subProbAll. A vertical axis of the graph 650 represents $\Delta P_{low}(i)$. As shown in FIG. 10, $\Delta P_{low}(i)$ is determined utilizing a ramp function controlled based on the combined factor subProbAll.

Figure 11:
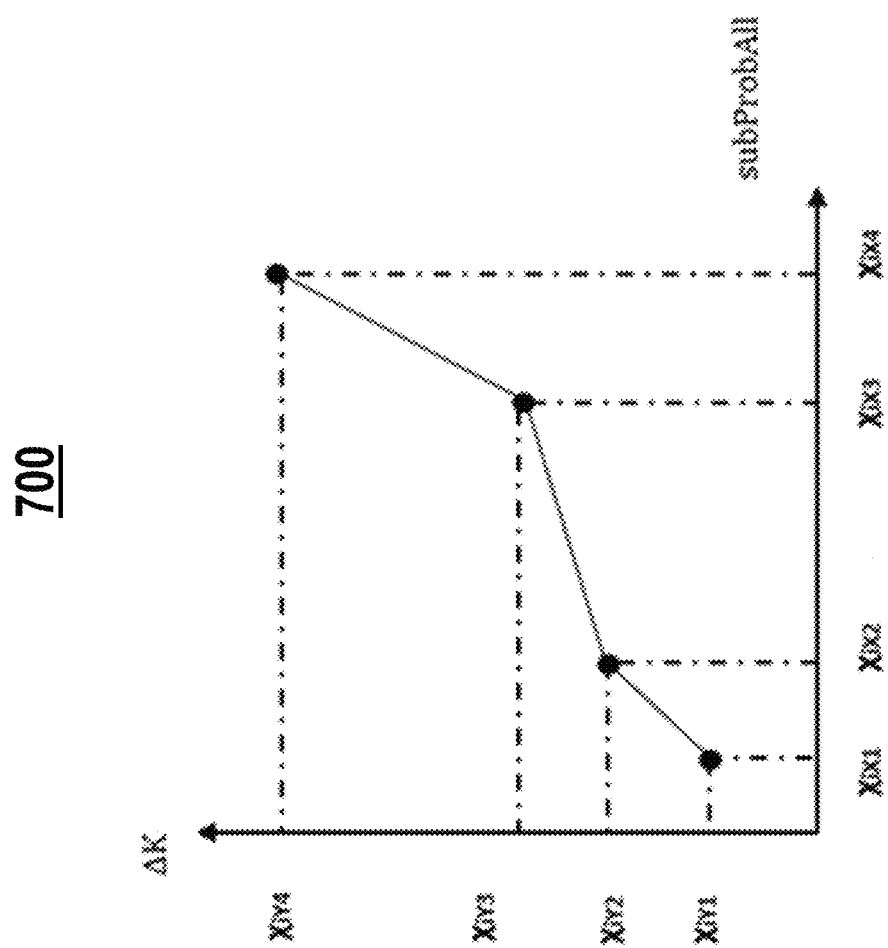
FIG. 11 is a graph illustrating a ramp function for $\Delta K(i)$, in one or more embodiments.

FIG. 11 is a graph 700 illustrating a ramp function for ΔK(i), in one or more embodiments. A horizontal axis of the graph 700 represents a combined factor subProbAll. A vertical axis of the graph 700 represents ΔK(i). As shown in FIG. 11, ΔK(i) is determined utilizing a ramp function controlled based on the combined factor subProbAll.

Figure 12:
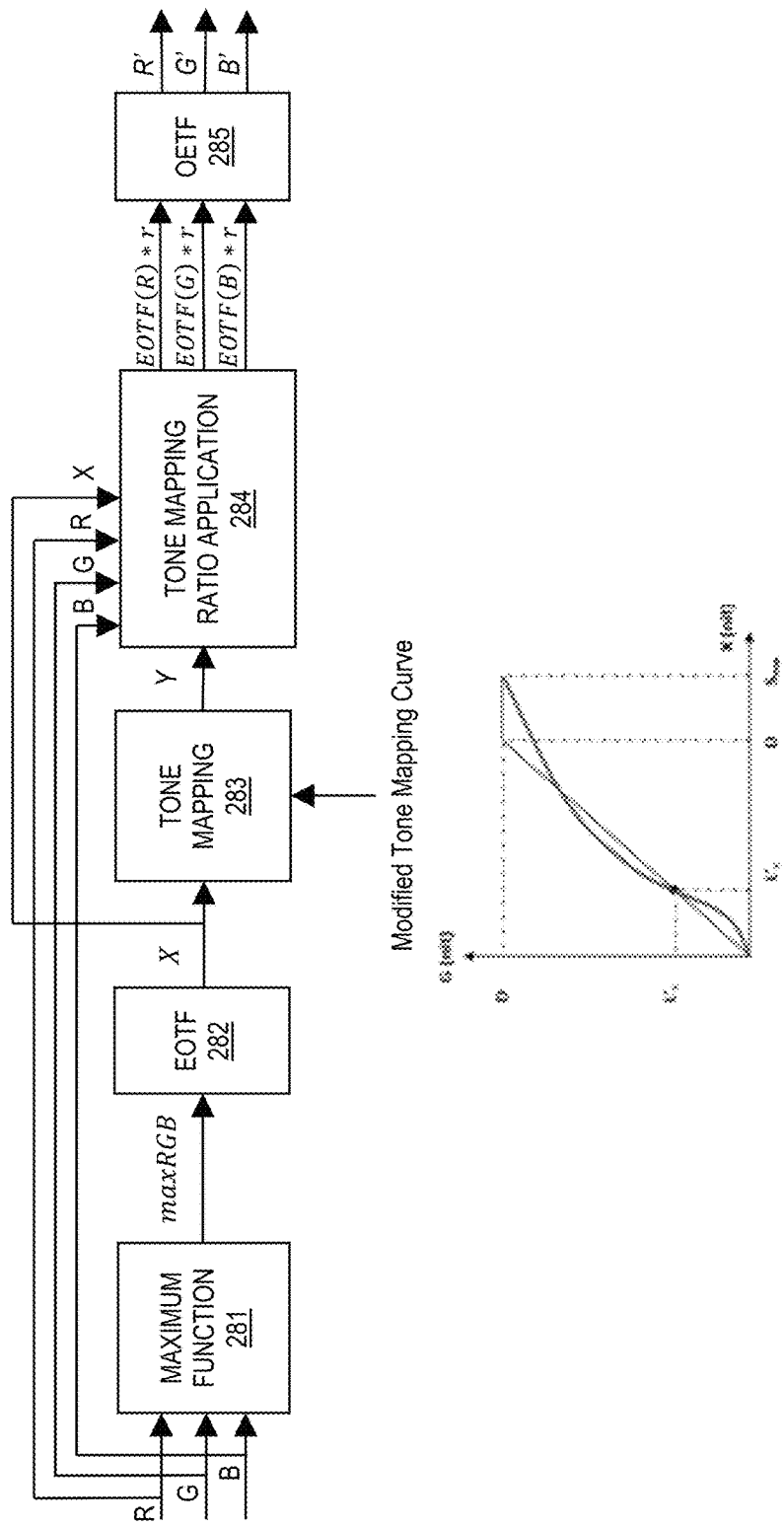
FIG. 12 illustrates an example tone mapping curve application system, in one or more embodiments.

FIG. 12 illustrates an example tone mapping curve application system 280, in one or more embodiments. In one embodiment, the tone mapping curve application system 280 provides color hue preservation via tone mapping. Specifically, in one embodiment, the tone mapping curve application system 280 comprises a maximum function unit 281. The maximum function unit 281 is configured to: (1) receive a mastered video (e.g., from the de-quantizer 220) including a red (R) code value, a green (G) code value, and a blue (B) code value, and (2) determine a maximum code value maxRGB of the R, G, and B code values by applying a maximum (i.e., max) function to the R, G, and B code values (e.g., max(R, G, B)).

In one embodiment, tone mapping curve application system 280 comprises an Electro-Optical Transfer Function (EOTF) unit 282. The EOTF unit 282 is configured to: (1) receive a maximum code value maxRGB (e.g., from the maximum function unit 281), and (2) determine a linear luminance value X by applying an EOTF to the maximum code value maxRGB.

In one embodiment, tone mapping curve application system 280 comprises a tone mapping unit 283. The tone mapping unit 283 is configured to: (1) receive a linear luminance value X (e.g., from the EOTF unit 282), (2) receive a modified tone mapping function (i.e., modified tone mapping curve) (e.g., from the ambient light compensation system 270), and (3) determine (i.e., lookup) a tone mapping value Y that the modified tone mapping function maps the linear luminance value X to (e.g., tmLUT(X)).

In one embodiment, tone mapping curve application system 280 comprises a tone mapping ratio application unit 284. The tone mapping ratio application unit 284 is configured to: (1) receive a linear luminance value X (e.g., from the EOTF unit 282), (2) receive a tone mapping value Y (e.g., from the tone mapping unit 283), (3) determine a tone mapping ratio r based on the linear luminance value X and the tone mapping value Y, wherein $$r=\frac{X}{Y},$$

(4) determine linear values EOTF(R), EOTF(G), and EOTF (B) by applying an EOTF to each of the R, G, and B code values, respectively, and (5) apply the tone mapping ratio r to each of the linear values EOTF(R), EOTF(G), and EOTF (B), resulting in scaled linear values EOTF(R)*r, EOTF(G) *r, and EOTF(B)*r, respectively.

In one embodiment, tone mapping curve application system 280 comprises an Opto Electrical Transfer Function (OETF) unit 285. The OETF unit 285 is configured to: (1) receive scaled linear values EOTF(R)*r, EOTF(G)*r, and EOTF(B)*r (e.g., from the tone mapping ratio application unit 284), and (2) determine a R' code value, a G' code value, and a B' code value of a tone-mapped video by applying an OETF to each of the scaled linear values EOTF(R)*r, EOTF(G)*r, and EOTF(B)*r, resulting in the tone-mapped video with ambient light compensation and color hue preservation (i.e., x, y coordinates in a CIE xyY color space remain unchanged, thereby preserving color hue).

Table 1 below provides example pseudocode implemented by the tone mapping curve application system 280 for color hue preservation, in one or more embodiments.

TABLE 1

X = EOTF(max(R, G, B))
Y = tmLUT(X)
r = Y/X
R' = OETF(EOTF(R) * r)
G' = OETF(EOTF(G) * r)
B' = OETF(EOTF(B) * r)

Figure 13:
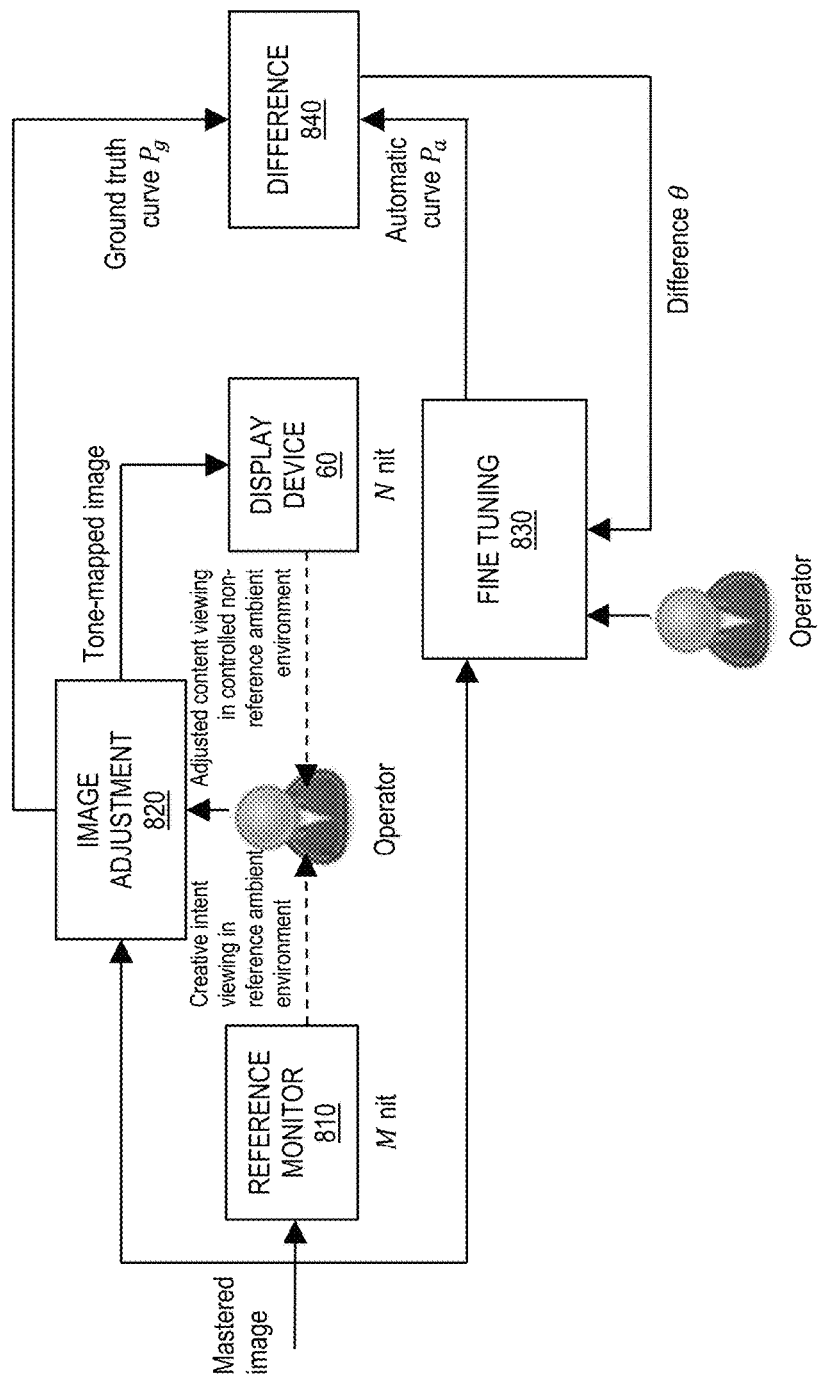
FIG. 13 illustrates an example ambient light compensation development system, in one or more embodiments.

FIG. 13 illustrates an example ambient light compensation development system 800, in one or more embodiments. In one embodiment, the ambient light compensation development system 800 is utilized to develop an algorithm for ambient light compensation that preserves creative intent in different ambient environments. Specifically, in one embodiment, the ambient light compensation development system 800 comprises: (1) a reference monitor 810 with peak luminance level M deployed on a first ambient environment used as a reference ("reference ambient environment"), (2) a display device 60 with peak luminance level N deployed on a second ambient environment that is controlled and different from the reference ambience environment ("controlled non-reference ambient environment"), and (3) an image adjustment unit 820.

Let $P_g$ generally denote a tone mapping curve representing ground truth for ambient light compensation ("ground truth curve"). The development of an algorithm for ambient light compensation involves the following steps: (1) displaying an image of a mastered video ("mastered image") on the reference monitor 810 to provide an operator with creative intent viewing in the reference ambient environment, (2) displaying an image of a tone-mapped video ("tone-mapped image") on the display device 60 to provide the operator with adjusted content viewing in the controlled non-reference ambient environment, wherein the tone-mapped image is the mastered image with ambient light compensation, (3) the operator comparing the tone-mapped image against the mastered image, and adjusting, via the image adjustment unit 820, the tone-mapped image based on the comparison, and (4) generating, via the image adjustment unit 820, a ground truth curve $P_g$ based on the adjustment.

Let $P_a$ generally denote an ambient light compensation curve automatically generated based on the algorithm for ambient light compensation ("automatic curve"). In one embodiment, the ambient light compensation development system 800 comprises a fine tuning unit 830 and a difference unit 840. The development of the algorithm for ambient light compensation further involves the following steps: (1) determining, via the difference unit 840, a difference θ between the ground truth curve and the automatic curve, and (2) an operator (or developer) fine tuning the algorithm to minimize the difference θ. In one embodiment, the resulting fine tuned algorithm is implemented in the ambient light compensation system 270 (e.g., deployed in the ambient light compensation gain unit 274) to correct content (e.g., mastered video) provided to a display device 60 to compensate for impact of ambient light in an environment of the display device 60.

In one embodiment, the difference θ is determined in accordance with equation (8) provided below:

$$\theta = \mathrm{argmin}(|P_g - P_a|) \qquad (8).$$

Figure 14A:
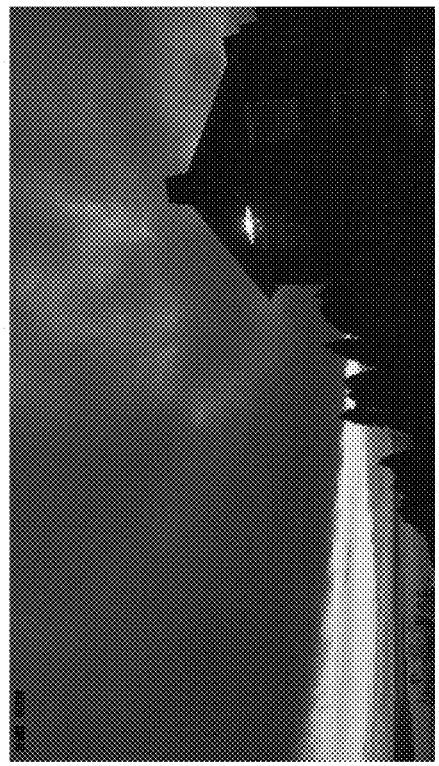
FIG. 14A is an example mastered image viewed in a reference ambient environment with a low degree/level of ambient light, in one or more embodiments.

FIG. 14A is an example mastered image 900 viewed in a reference ambient environment with a low degree/level of ambient light, in one or more embodiments. In one embodiment, the reference ambient environment represents an ambient environment at a studio suitable for color grading. For example, the reference ambient environment is dark, and the mastered image is viewed by a colorist on a mastering monitor 370.

Figure 14B:
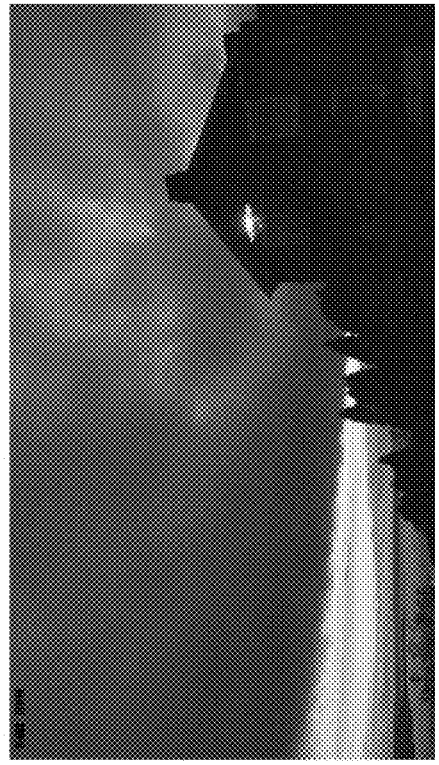
FIG. 14B is an example tone-mapped image viewed in an ambient environment with a high degree/level of ambient light, in one or more embodiments.

FIG. 14B is an example tone-mapped image 910 viewed in an ambient environment with a high degree/level of ambient light, in one or more embodiments. In one embodiment, the ambient environment represents an ambient environment surrounding a display device 60. For example, the ambient environment is bright, and the tone-mapped image 910 is viewed by a user on the display device 60. The HDR tone mapping with ambient light compensation system 240 generates an ambient light compensation curve based on creative intent metadata corresponding to the mastered image 900 (FIG. 14A), and applies ambient light compensation to the mastered image 900 based on the ambient light compensation curve, resulting in the tone-mapped image 910 with compensation for the bright ambient environment. The perceptual feeling of the user viewing the tone mastered image in the bright ambient environment is similar to that of the colorist viewing the mastered imaged in the dark reference ambient environment.

Figure 14C:
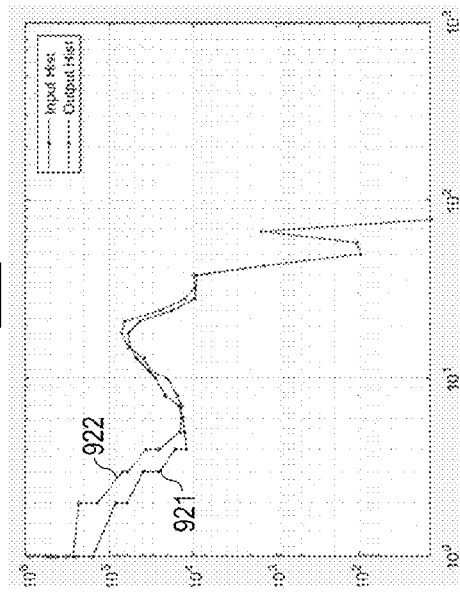
FIG. 14C is an example graph illustrating histograms corresponding to the mastered image and the tone-mapped image of FIGS. 14A-14B, in one or more embodiments.

FIG. 14C is an example graph 920 illustrating histograms corresponding to the mastered image and the tone-mapped image of FIGS. 14A-14B, in one or more embodiments. A horizontal axis of the graph 920 represents luminance in nits. A vertical axis of the graph 920 represents pixel counts. The graph 920 comprises: (1) a first histogram 921 corresponding to the mastered image, and (2) a second histogram 922 corresponding to the tone-mapped image.

Figure 15A:
FIG. 15A is an example mastered image viewed in a reference ambient environment with a low degree/level of ambient light, in one or more embodiments.

FIG. 15A is an example mastered image 950 viewed in a reference ambient environment with a low degree/level of ambient light, in one or more embodiments. In one embodiment, the reference ambient environment represents an ambient environment at a studio suitable for color grading. For example, the reference ambient environment is dark, and the mastered image is viewed by a colorist on a mastering monitor 370.

Figure 15B:
FIG. 15B is an example tone-mapped image viewed in an ambient environment with a high degree/level of ambient light, in one or more embodiments.

FIG. 15B is an example tone-mapped image 960 viewed in an ambient environment with a high degree/level of ambient light, in one or more embodiments. In one embodiment, the ambient environment represents an ambient environment of a display device 60. For example, the ambient environment is bright, and the tone-mapped image 960 is viewed by a user on the display device 60. The HDR tone mapping with ambient light compensation system 240 generates an ambient light compensation curve based on creative intent metadata corresponding to the mastered image 950 (FIG. 15A), and applies ambient light compensation to the mastered image 950 based on the ambient light compensation curve, resulting in the tone-mapped image 960 with compensation for the bright ambient environment. The perceptual feeling of the user viewing the tone mastered image in the bright ambient environment is similar to that of the colorist viewing the mastered imaged in the dark reference ambient environment.

Figure 15C:
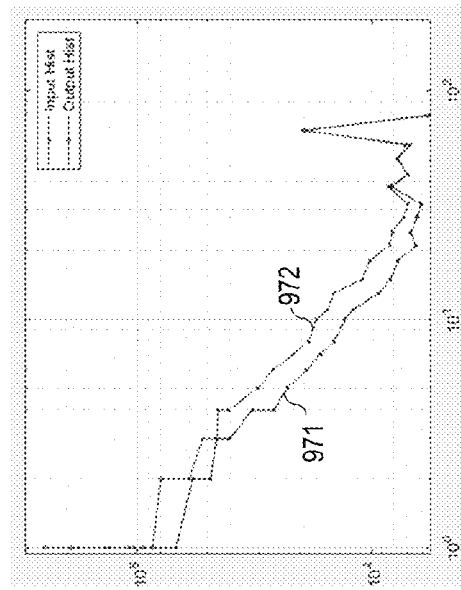
FIG. 15C is an example graph illustrating histograms corresponding to the mastered image and the tone-mapped image of FIGS. 15A-15B, in one or more embodiments.

FIG. 15C is an example graph 970 illustrating histograms corresponding to the mastered image and the tone-mapped image of FIGS. 15A-15B, in one or more embodiments. A horizontal axis of the graph 970 represents luminance in nits. A vertical axis of the graph 970 represents pixel counts. The graph 970 comprises: (1) a first histogram 971 corresponding to the mastered image, and (2) a second histogram 972 corresponding to the tone-mapped image.

In one embodiment, for the same degree/level of ambient light in an ambient environment, the ambient light compensation system 270 generates different ambient light compensation curves for different images (i.e., frames/scenes) based on creative intent metadata corresponding to the images.

Figure 16A:
FIG. 16A is an example image with a large amount of dark details ("dark image"), in one or more embodiments.
Figure 16B:
FIG. 16B is another example image with a large amount of bright details ("bright image"), in one or more embodiments.

FIG. 16A is an example image 1000 with a large amount of dark details ("dark image"), in one or more embodiments. FIG. 16B is another example image 1010 with a large amount of bright details ("bright image"), in one or more embodiments. As shown in FIGS. 16A-16B, the dark image 1000 has more dark details than the bright image 1010, and the bright image 1010 has more bright details than the dark image 1000.

Figure 16C:
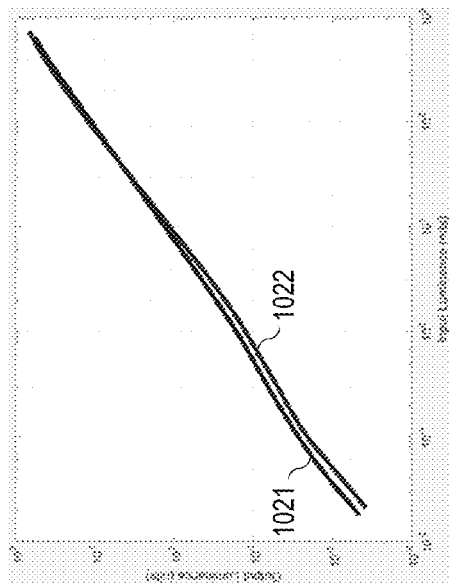
FIG. 16C is an example graph illustrating ambient light compensation curves for the dark image and the bright image of FIGS. 16A-16B, in one or more embodiments.

FIG. 16C is an example graph 1020 illustrating ambient light compensation curves for the dark image 1000 and the bright image 1010 of FIGS. 16A-16B, in one or more embodiments. A horizontal axis of the graph 1020 represents input luminance in nits. A vertical axis of the graph 1020 represents output luminance in nits. The graph 1020 comprises: (1) a first ambient light compensation curve 1021 generated by the ambient light compensation system 270 for the dark image 1000 based on creative intent metadata corresponding to the dark image 1000 and ambient light information (i.e., a degree/level of ambient light), and (2) a second ambient light compensation curve 1022 generated by the ambient light compensation system 270 for the bright image 1010 based on creative intent metadata corresponding to the bright image 1010 and the same ambient light information (i.e., the same degree/level of ambient light).

As shown in FIG. 16C, the first ambient light compensation curve 1021 factors into account the higher amount of dark details in the image 1000, and the second ambient light compensation curve 1022 factors into account the fewer amount of dark details in the image 1010.

Figure 16E:
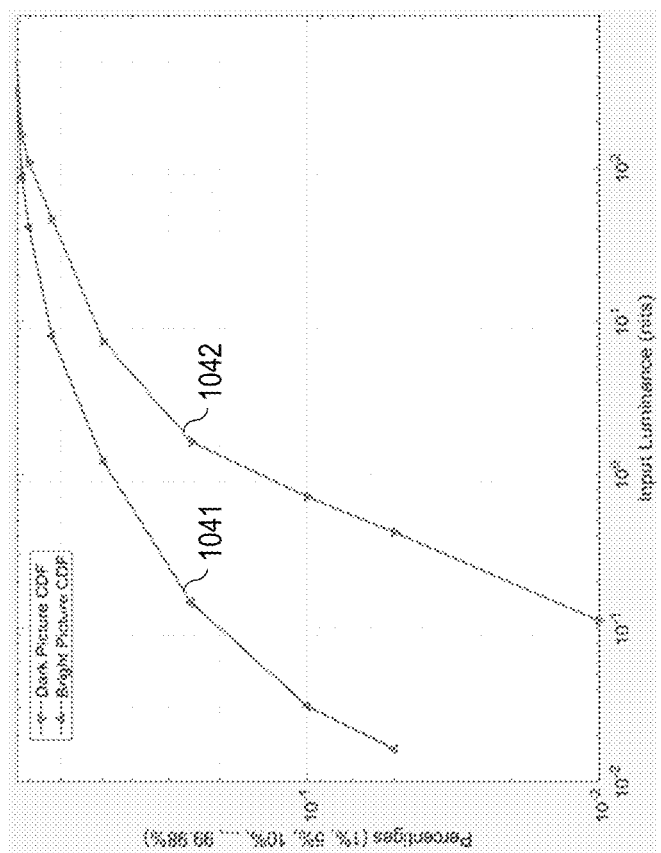
FIG. 16E is an example graph illustrating CDF curves for the dark image and the bright image of FIGS. 16A-16B, in one or more embodiments.
Figure 16D:
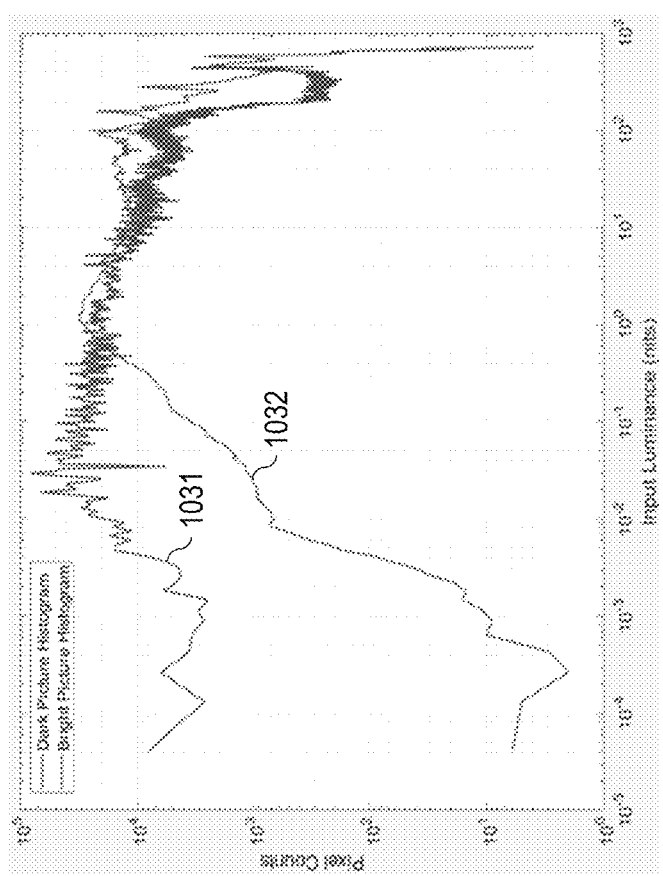
FIG. 16D is an example graph illustrating histograms for the dark image and the bright image of FIGS. 16A-16B, in one or more embodiments.

FIG. 16D is an example graph 1030 illustrating histograms for the dark image 1000 and the bright image 1010 of FIGS. 16A-16B, in one or more embodiments. A horizontal axis of the graph 1030 represents input luminance in nits. A vertical axis of the graph 1030 represents pixel counts. The graph 1030 comprises: (1) a first histogram 1031 corresponding to the dark image 1000, and (2) a second histogram 1032 corresponding to the bright image 1010. As shown in FIG. 16D, the dark image 1000 has more dark details than the bright image 1010, and the bright image 1010 has more bright details than the dark image 1000.

FIG. 16E is an example graph 1040 illustrating CDF curves for the dark image 1000 and the bright image 1010 of FIGS. 16A-16B, in one or more embodiments. A horizontal axis of the graph 1040 represents input luminance in nits. A vertical axis of the graph 1040 represents percentages. The graph 1040 comprises: (1) a first CDF curve 1041 representing a distribution of pixels in the dark image 1000, wherein the distribution is included in the creative intent metadata corresponding to the dark image 1000, and (2) a second CDF curve 1042 representing a distribution of pixels in the bright image 1010, wherein the distribution is included in the creative intent metadata corresponding to the bright image 1010. As shown in FIG. 16E, the dark image 1000 has more dark details than the bright image 1010, and the bright image 1010 has more bright details than the dark image 1000.

In one embodiment, for different degrees/levels of ambient light in different ambient environments, the ambient light compensation system 270 generates different ambient light compensation curves for the same image (i.e., frame/scene) based on creative intent metadata corresponding to the image. For example, assume a first ambient environment with a first degree/level of ambient light, and a second ambient environment with a second degree/level of ambient light that is higher than the first degree/level of ambient light (i.e., the second ambient environment is brighter). For the same image, the ambient light compensation system 270 generates a first ambient light compensation curve based on the first degree/light of ambient light, and a second ambient light compensation curve based on the second degree/light of ambient light, wherein the second ambient light compensation curve is brighter than the first ambient light compensation curve.

Figure 17:
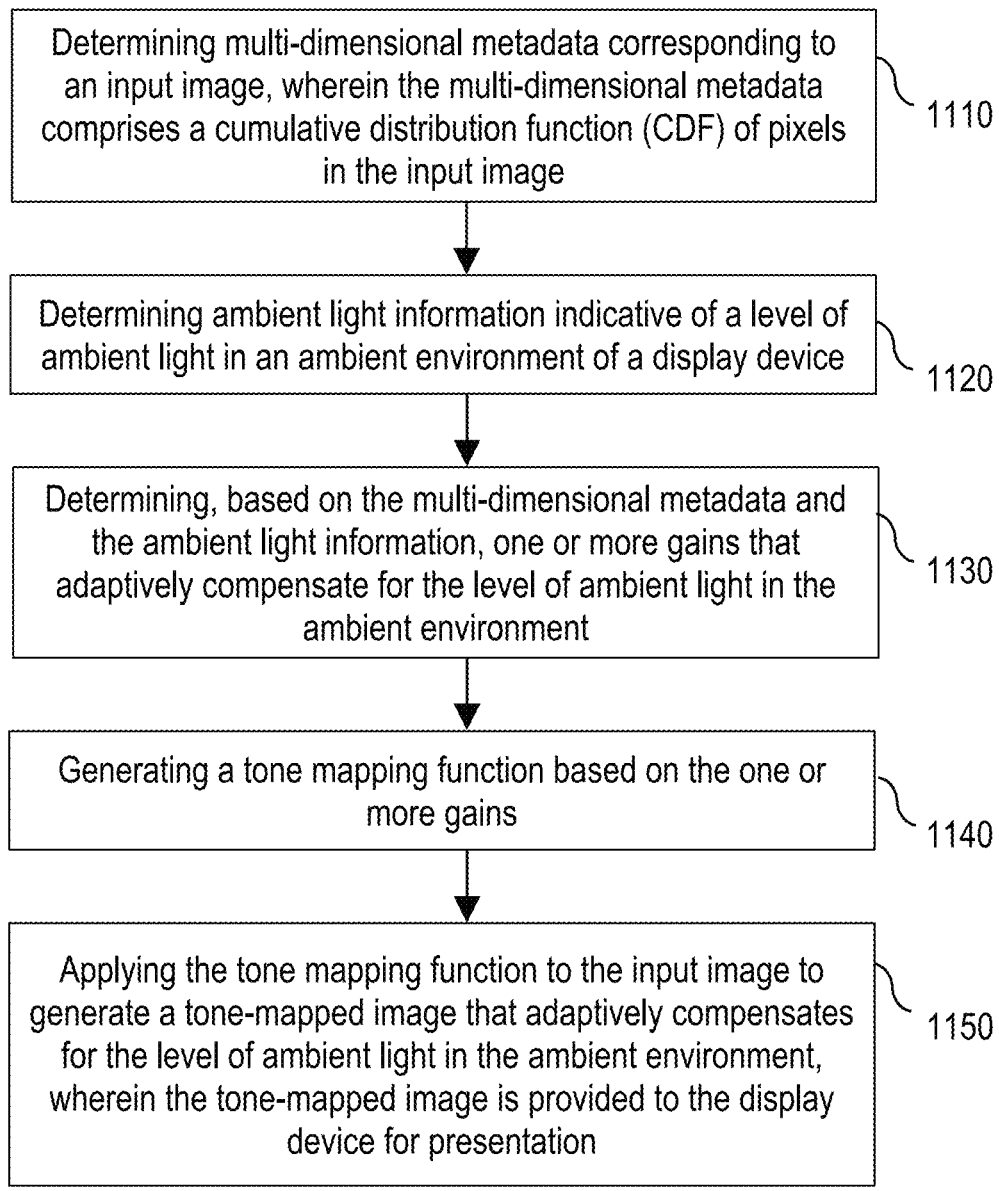
FIG. 17 is a flowchart of an example process for implementing HDR tone mapping of HDR content for presentation on a display device, in one or more embodiments.

FIG. 17 is a flowchart of an example process 1100 for implementing HDR tone mapping of HDR content for presentation on a display device, in one or more embodiments. Process block 1110 includes determining multi-dimensional metadata corresponding to an input image, wherein the multi-dimensional metadata comprises a cumulative distribution function (CDF) of pixels in the input image. Process block 1120 includes determining ambient light information indicative of a level of ambient light in an ambient environment of a display device. Process block 1130 includes determining, based on the multi-dimensional metadata and the ambient light information, one or more gains that adaptively compensate for the level of ambient light in the ambient environment. Process block 1140 includes generating a tone mapping function based on the one or more gains. Process block 1150 includes applying the tone mapping function to the input image to generate a tone-mapped image that adaptively compensates for the level of ambient light in the ambient environment, wherein the tone-mapped image is provided to the display device for presentation.

In one embodiment, process blocks 1110-1150 may be performed by one or more components of the HDR tone mapping system 200, such as the ambient light signal unit 230, and the HDR tone mapping with ambient light compensation system 240 including the metadata parser unit 250, the ambient light compensation system 270, and the tone mapping curve application unit 280.

Figure 18:
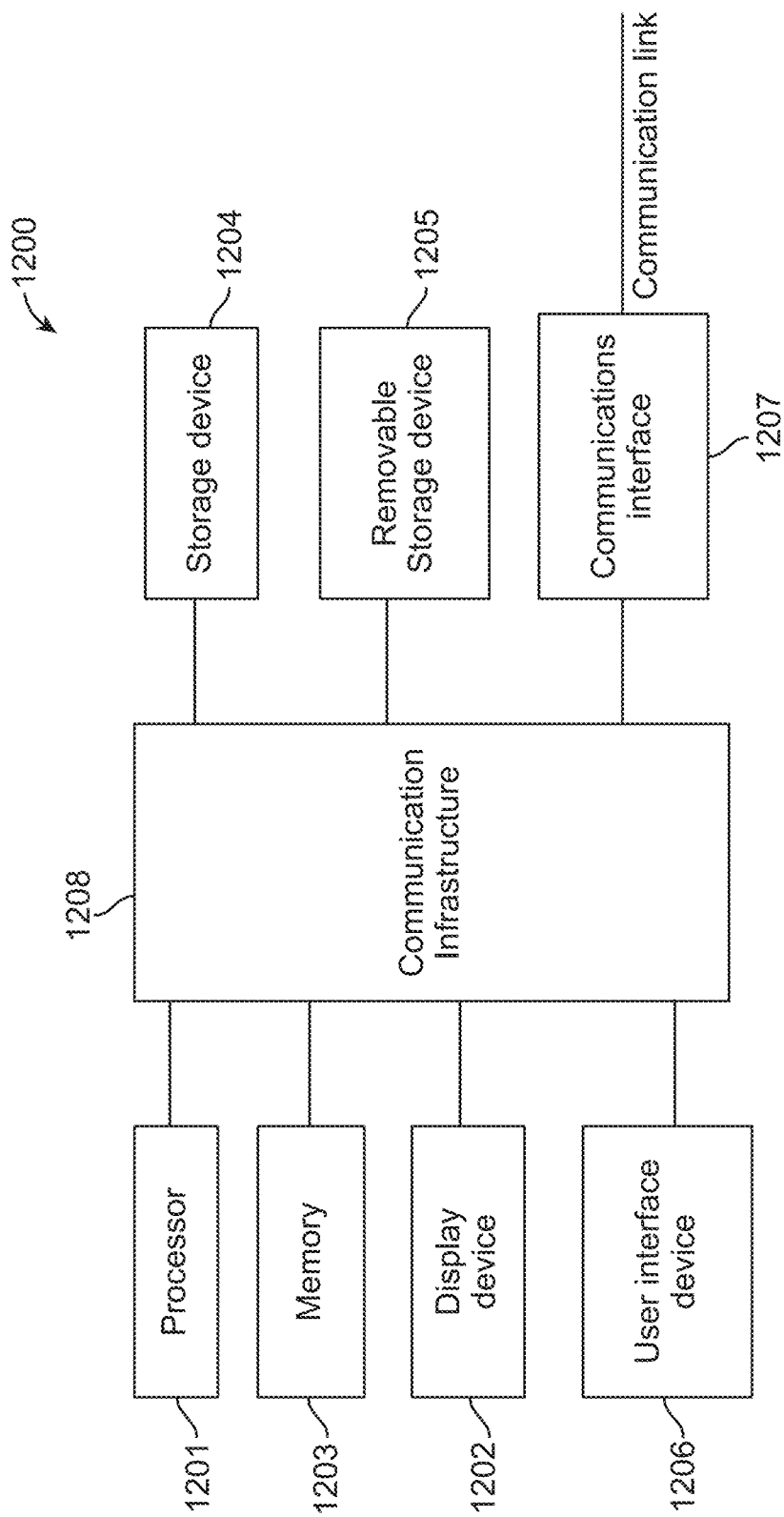
FIG. 18 is a high-level block diagram showing an information processing system comprising a computer system useful for implementing the disclosed embodiments.

FIG. 18 is a high-level block diagram showing an information processing system comprising a computer system 1200 useful for implementing the disclosed embodiments. The system 200 may be incorporated in the computer system 1200. The computer system 1200 includes one or more processors 1201, and can further include an electronic display device 1202 (for displaying video, graphics, text, and other data), a main memory 1203 (e.g., random access memory (RAM)), storage device 1204 (e.g., hard disk drive), removable storage device 1205 (e.g., removable storage drive, removable memory module, a magnetic tape drive, optical disk drive, computer readable medium having stored therein computer software and/or data), viewer interface device 1206 (e.g., keyboard, touch screen, keypad, pointing device), and a communication interface 1207 (e.g., modem, a network interface (such as an Ethernet card), a communications port, or a PCMCIA slot and card). The communication interface 1207 allows software and data to be transferred between the computer system and external devices. The system 1200 further includes a communications infrastructure 1208 (e.g., a communications bus, cross-over bar, or network) to which the aforementioned devices/modules 1201 through 1207 are connected.

Information transferred via communications interface 1207 may be in the form of signals such as electronic, electromagnetic, optical, or other signals capable of being received by communications interface 1207, via a communication link that carries signals and may be implemented using wire or cable, fiber optics, a phone line, a cellular phone link, a radio frequency (RF) link, and/or other communication code values. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 1100 (FIG. 17) may be stored as program instructions on the memory 1203, storage device 1204, and/or the removable storage device 1205 for execution by the processor 1201.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    determining multi-dimensional metadata corresponding to an input image, wherein the multi-dimensional metadata comprises a cumulative distribution function (CDF) of pixels in the input image;
    determining ambient light information indicative of a level of ambient light in an ambient environment of a display device;
    determining, based on the multi-dimensional metadata and the ambient light information, one or more gains that adaptively compensate for the level of ambient light in the ambient environment;
    generating a tone mapping function by generating one or more sections of a Bezier curve based on the one or more gains, wherein the tone mapping function includes the one or more sections of the Bezier curve; and
    applying the tone mapping function to the input image to generate a tone-mapped image that adaptively compensates for the level of ambient light in the ambient environment, wherein the tone-mapped image is provided to the display device for presentation.

2. The method of claim 1, wherein the multi-dimensional metadata comprises, for each percentile of the CDF, a corresponding pair of values including a percentile luminance value and a pixel percentage value.

3. The method of claim 1, wherein each of the one or more sections of the Bezier curve has a corresponding adjustment point along the Bezier curve.

4. The method of claim 3, wherein generating the tone mapping function comprises:
    determining, based on the one or more gains, a knee point modifier, a lower curve modifier for modifying a lower section included in the one or more sections of the Bezier curve, and a higher curve modifier for modifying a higher section included in the one or more sections of the Bezier curve.

5. The method of claim 4, wherein generating the tone mapping function further comprises:
    modifying the lower section of the Bezier curve based on the lower curve modifier;
    modifying the higher section of the Bezier curve based on the higher curve modifier; and
    generating, based on the knee point modifier, the lower curve modifier, and the higher curve modifier, one or more parameters corresponding to the tone mapping function.

6. The method of claim 5, wherein the one or more parameters include a knee point, a first adjustment point corresponding to the lower section of the Bezier curve, and a second adjustment point corresponding to the higher section of the Bezier curve.

7. The method of claim 1, wherein the tone mapping function preserves color hue of the input image.

8. The method of claim 1, wherein the input image is a frame of an input video.

9. A system comprising:
    at least one processor; and
    a non-transitory processor-readable memory device storing instructions that when executed by the at least one processor causes the at least one processor to perform operations including:
        determining multi-dimensional metadata corresponding to an input image, wherein the multi-dimensional metadata comprises a cumulative distribution function (CDF) of pixels in the input image;
        determining ambient light information indicative of a level of ambient light in an ambient environment of a display device;
        determining, based on the multi-dimensional metadata and the ambient light information, one or more gains that adaptively compensate for the level of ambient light in the ambient environment;
        generating a tone mapping function by generating one or more sections of a Bezier curve based on the one or more gains, wherein the tone mapping function includes the one or more sections of the Bezier curve; and applying the tone mapping function to the input image to generate a tone-mapped image that adaptively compensates for the level of ambient light in the ambient environment, wherein the tone-mapped image is provided to the display device for presentation.

10. The system of claim 9, wherein the multi-dimensional metadata comprises, for each percentile of the CDF, a corresponding pair of values including a percentile luminance value and a pixel percentage value.

11. The system of claim 9, wherein each of the one or more sections of the Bezier curve has a corresponding adjustment point along the Bezier curve.

12. The system of claim 11, wherein generating the tone mapping function comprises:

determining, based on the one or more gains, a knee point modifier, a lower curve modifier for modifying a lower section included in the one or more sections of the Bezier curve, and a higher curve modifier for modifying a higher section included in the one or more sections of the Bezier curve.

13. The system of claim 12, wherein generating the tone mapping function further comprises:

modifying the lower section of the Bezier curve based on the lower curve modifier;

modifying the higher section of the Bezier curve based on the higher curve modifier; and generating, based on the knee point modifier, the lower curve modifier, and the higher curve modifier, one or more parameters corresponding to the tone mapping function.

14. The system of claim 13, wherein the one or more parameters include a knee point, a first adjustment point corresponding to the lower section of the Bezier curve, and a second adjustment point corresponding to the higher section of the Bezier curve.

15. The system of claim 9, wherein the tone mapping function preserves color hue of the input image.

16. The system of claim 9, wherein the input image is a frame of an input video.

17. A non-transitory processor-readable medium that includes a program that when executed by a processor performs a method comprising:

determining multi-dimensional metadata corresponding to an input image, wherein the multi-dimensional metadata comprises a cumulative distribution function (CDF) of pixels in the input image;

determining ambient light information indicative of a level of ambient light in an ambient environment of a display device;

determining, based on the multi-dimensional metadata and the ambient light information, one or more gains that adaptively compensate for the level of ambient light in the ambient environment;

generating a tone mapping function by generating one or more sections of a Bezier curve based on the one or more gains, wherein the tone mapping function includes the one or more sections of the Bezier curve; and applying the tone mapping function to the input image to generate a tone-mapped image that adaptively compensates for the level of ambient light in the ambient environment, wherein the tone-mapped image is provided to the display device for presentation.

18. The non-transitory processor-readable medium of claim 17, wherein the multi-dimensional metadata comprises, for each percentile of the CDF, a corresponding pair of values including a percentile luminance value and a pixel percentage value.

19. The non-transitory processor-readable medium of claim 17, wherein each of the one or more sections of the Bezier curve has a corresponding adjustment point along the Bezier curve.

20. The non-transitory processor-readable medium of claim 19, wherein generating the tone mapping function comprises:

determining, based on the one or more gains, a knee point modifier, a lower curve modifier for modifying a lower section included in the one or more sections of the Bezier curve, and a higher curve modifier for modifying a higher section included in the one or more sections of the Bezier curve;

modifying the lower section of the Bezier curve based on the lower curve modifier;

modifying the higher section of the Bezier curve based on the higher curve modifier; and generating, based on the knee point modifier, the lower curve modifier, and the higher curve modifier, one or more parameters corresponding to the tone mapping function.

* * * * *